United States Patent
Srikantiah et al.

(10) Patent No.: US 12,124,400 B2
(45) Date of Patent: Oct. 22, 2024

(54) INDEPENDENT ADDRESSING OF ONE-WIRE AND TWO-WIRE DEVICES ON A SHARED RFFE BUS INTERFACE

(71) Applicant: QUALCOMM Incorporated, San Diego, CA (US)

(72) Inventors: Umesh Srikantiah, San Diego, CA (US); Lalan Jee Mishra, Escondido, CA (US); Francesco Gatta, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 18/157,000

(22) Filed: Jan. 19, 2023

(65) Prior Publication Data

US 2024/0248870 A1 Jul. 25, 2024

(51) Int. Cl.
*G06F 13/00* (2006.01)
*G06F 13/42* (2006.01)

(52) U.S. Cl.
CPC .............................. *G06F 13/4291* (2013.01)

(58) Field of Classification Search
CPC ...... G06F 13/00; G06F 13/4063; G05F 13/405
See application file for complete search history.

(56) References Cited

U.S. PATENT DOCUMENTS

| | | | |
|---|---|---|---|
| 2011/0128977 A1* | 6/2011 | Suzuki | G06F 13/4239 370/498 |
| 2011/0293035 A1* | 12/2011 | Kobayashi | H04L 25/4908 375/295 |
| 2019/0108149 A1* | 4/2019 | Graif | G06F 13/4291 |
| 2020/0073836 A1 | 3/2020 | Graif et al. | |
| 2020/0081859 A1* | 3/2020 | Mishra | G06F 13/4054 |
| 2020/0133904 A1 | 4/2020 | Takahashi et al. | |

OTHER PUBLICATIONS

International Search Report and Written Opinion—PCT/US2023/083856—ISA/EPO—Apr. 4, 2024.

* cited by examiner

*Primary Examiner* — Henry Tsai
*Assistant Examiner* — Kim T Huynh
(74) *Attorney, Agent, or Firm* — Loza & Loza, LLP/Qualcomm

(57) ABSTRACT

A data communication apparatus coupled to a serial bus has a protocol controller that configures a first plurality of subordinate devices with device identifiers unique within the first plurality of subordinate devices and configures a second plurality of subordinate devices with device identifiers unique within the second plurality of subordinate devices. A sequence start condition transmitted over the serial bus indicates either a first communication mode in which a clock signal is provided to the serial bus or a second communication mode in which no clock signal is provided. A device identifier associated with the first plurality of subordinate devices is used to transmit a first datagram over the serial bus in the first communication mode, and a device identifier associated with the second plurality of subordinate devices is used to transmit a second datagram over the serial bus in the second communication mode.

30 Claims, 16 Drawing Sheets

2-Wire RFFE Bus

1-Wire RFFE Bus

2-Wire Multimode RFFE Bus

INDEPENDENT ADDRESSING OF ONE-WIRE AND TWO-WIRE DEVICES ON A SHARED RFFE BUS INTERFACE

TECHNICAL FIELD

The present disclosure relates generally to serial communication and more particularly to addressing devices configured for one-wire communication and devices configured for two-wire communication over a shared Radio Frequency Front-End serial bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or $I^2C$) serial interface and its derivatives and alternatives.

The Mobile Industry Processor Interface (MIPI) Alliance defines standards and protocols for the Improved Inter-Integrated Circuit (I3C) serial interface, the Radio Frequency Front-End (RFFE) interface, the system power management interface (SPMI) and other interfaces. These interfaces may be used to connect processors, sensors and other peripherals, for example. In some interfaces, multiple host devices are coupled to the serial bus such that two or more devices can serve as host device for different types of messages transmitted on the serial bus. The RFFE interface defines a communication interface that can be for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. In another example, SPMI specifications defined by the MIPI Alliance provide a hardware interface that may be implemented between baseband or application processors and peripheral components. In some implementations, the SPMI is deployed to support power management operations within a device.

As device complexity increases, demand for input/output pins also increases and there is demand for simplified bus architectures and protocols, that can coexist with legacy bus architectures and protocols.

SUMMARY

Certain aspects of the disclosure relate to systems, apparatus, methods and techniques that can support communication with device interfaces that use a single-wire link while some devices coupled to the single-wire link use multiple wires for communication.

In various aspects of the disclosure, a method performed at a host device coupled to a serial bus includes configuring each of a first plurality of subordinate devices with a device identifier that is unique within the first plurality of subordinate devices; configuring each of a second plurality of subordinate devices with a device identifier that is unique within the second plurality of subordinate devices; transmitting a sequence start condition over a data wire of the serial bus, the sequence start condition indicating whether clock pulses are to be provided in a clock signal on a clock wire of the serial bus concurrently with a transaction initiated by the sequence start condition; using a device identifier associated with the first plurality of subordinate devices to transmit a first datagram over the serial bus to one of the first plurality of subordinate devices when the sequence start condition indicates that the clock pulses are to be concurrently provided in the clock signal; and using a device identifier associated with the second plurality of subordinate devices to transmit a second datagram over the serial bus to one of the second plurality of subordinate devices when the sequence start condition indicates that no clock pulses are to be concurrently provided in the clock signal.

In various aspects of the disclosure, a data communication apparatus has an interface circuit adapted to couple the data communication apparatus to two wires of a serial bus; and a protocol controller configured to: configure each of a first plurality of subordinate devices with a device identifier that is unique within the first plurality of subordinate devices; configure each of a second plurality of subordinate devices with a device identifier that is unique within the second plurality of subordinate devices; transmit a sequence start condition over a data wire of the serial bus, the sequence start condition indicating whether clock pulses are to be provided in a clock signal on a clock wire of the serial bus concurrently with a transaction initiated by the sequence start condition; use a device identifier associated with the first plurality of subordinate devices to transmit a first datagram over the serial bus to one of the first plurality of subordinate devices when the sequence start condition indicates that the clock pulses are to be concurrently provided in the clock signal; and use a device identifier associated with the second plurality of subordinate devices to transmit a second datagram over the serial bus to one of the second plurality of subordinate devices when the sequence start condition indicates that no clock pulses are to be concurrently provided in the clock signal.

In various aspects of the disclosure, a method performed at a subordinate device coupled to a serial bus includes receiving a first sequence start condition from a data wire of the serial bus, the first sequence start condition indicating a first operating mode for the serial bus in which a first datagram transmitted after the first sequence start condition is to be transmitted concurrently with clock pulses in a clock signal transmitted on a clock wire of the serial bus; receiving a second sequence start condition from the data wire, the second sequence start condition indicating a second operating mode for the serial bus in which a second datagram transmitted after the second sequence start condition is to be transmitted with embedded clock information in a data signal; responding to a first command included in the first datagram when the first command is transmitted to an address corresponding to a first device identifier associated with the subordinate device; and responding to a second command included in the second datagram when the second command is transmitted to an address corresponding to a second device identifier associated with the subordinate device.

In various aspects of the disclosure, an apparatus has an interface circuit adapted to couple the apparatus to two wires of a serial bus, and a processor. The processor may be configured to receive a first sequence start condition from a data wire of the serial bus, the first sequence start condition indicating a first operating mode for the serial bus in which a first datagram transmitted after the first sequence start condition is to be transmitted concurrently with clock pulses in a clock signal transmitted on a clock wire of the serial bus; receive a second sequence start condition from the data wire, the second sequence start condition indicating a second operating mode for the serial bus in which a second datagram transmitted after the second sequence start condition is to be transmitted with embedded clock information in a data signal; respond to a first command included in the first datagram when the first command is transmitted to an address corresponding to a first device identifier associated with the apparatus; and respond to a second command included in the second datagram when the second command is transmitted to an address corresponding to a second device identifier associated with the apparatus.

DETAILED DESCRIPTION

Figure 1:
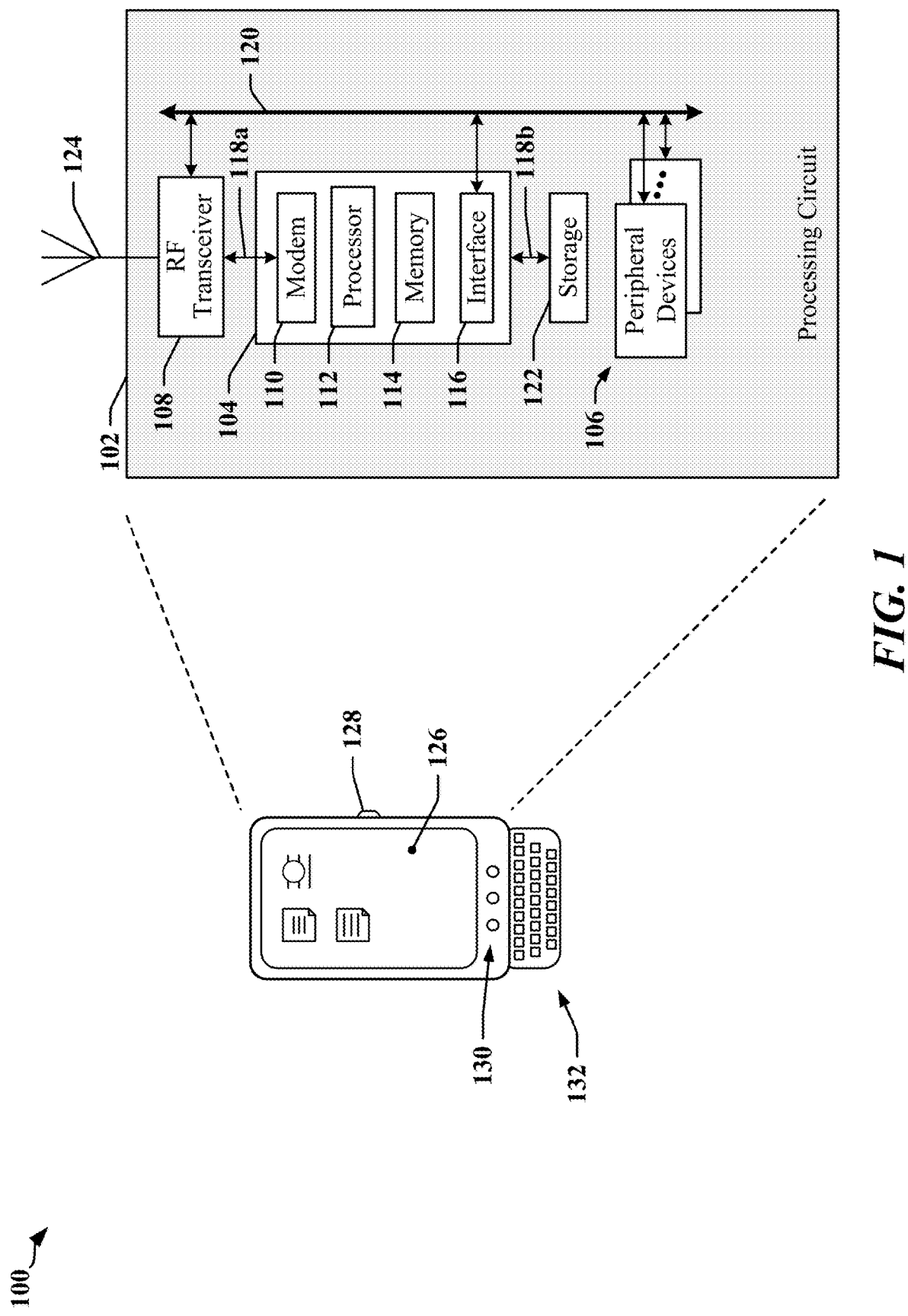
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain aspects of the disclosure relate to serial bus configurations in which multiple devices can communicate at various times. The described serial buses are typically operated in a hierarchical manner, in that one device controls communication during a transaction. The controlling device may be referred to as a host device, a bus master device, a managing device or another term favored by standards defining the protocols implemented by the controlling device. In some serial bus configurations, a single controlling device manages or controls communication during all transactions conducted over the serial bus. In other serial bus configurations, multiple devices can operate as the controlling device and one device serves as the controlling device for each transaction conducted over the serial bus. The controlling device may provide a common clock signal that is transmitted over a conventional two-wire serial bus. The controlling device may provide control signaling that identifies a type of transaction to be conducted over a conventional two-wire serial bus. During certain transactions, a controlling device may transmit commands directed to one or more receiving devices using address information provided in or with the commands. The receiving devices may be referred to as a subordinate device, a client device, a slave device, a peripheral device or another term favored by standards defining the protocols implemented by the controlling device. For the purposes of this disclosure, a controlling device will be referred to as a host device and associated receiving devices will be referred to as subordinate devices.

Overview

Devices that include multiple SoC and other IC devices often employ a shared communication interface that may include a serial bus or other data communication link used to connect processors with modems and other peripherals. The serial bus or other data communication link may be operated in accordance with one or more standards or protocols defined. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the imposition of more stringent timing constraints in support of applications, peripherals and sensors can result in greater demand on GPIO and communication link throughput.

Certain aspects of the disclosure relate to techniques for communication over a single wire, by combining data and clock information in the same signal. In one example, data and clock information can be encoded using pulse-width modulation (PWM). In another example, Manchester encoded data carries clock information in every transmitted bit. In one aspect, a host device may be adapted to communicate with some subordinate devices over a single wire (data only) and other devices over two wires (data and clock). The protocol controller may signal a type of (one-wire or two-wire) communication based on the duration of a sequence start condition (SSC) used to initiate a transaction.

Various aspects of the of the SSC are defined by RFFE protocols. The durations of the high portion and the low portion are specified by protocol and the rise and fall times of transitions in the SSC are defined by protocol. Limits on the frequency of the clock signal transmitted on the SCLK line of an RFFE bus may also be defined by protocol. In one aspect of this disclosure, a protocol controller may be configured to transmit a modified SSC to indicate when a transaction is to be conducted with a one-wire subordinate device. In certain examples, the protocol controller may transmit an extended-length SSC to target a one-wire subordinate device for communication. In some implementations, the protocol controller may transmit a shortened SSC to target a one-wire subordinate device for communication. In some instances, the protocol controller may transmit the SSC with modified rise and fall time to target a one-wire subordinate device for communication.

In one example, a host device has an interface circuit adapted to couple the apparatus to two wires of a serial bus and a protocol controller. The protocol controller may configure each of a first plurality of subordinate devices with a device identifier that is unique within the first plurality of subordinate devices; configure each of a second plurality of subordinate devices with a device identifier that is unique within the second plurality of subordinate devices; transmit a sequence start condition over a data wire of the serial bus, the sequence start condition indicating whether clock pulses are to be provided in a clock signal on a clock wire of the serial bus concurrently with a transaction initiated by the sequence start condition; use a device identifier associated with the first plurality of subordinate devices to transmit a first datagram over the serial bus to one of the first plurality of subordinate devices when the sequence start condition indicates that the clock pulses are to be concurrently provided in the clock signal; and use a device identifier associated with the second plurality of subordinate devices to transmit a second datagram over the serial bus to one of the second plurality of subordinate devices when the sequence start condition indicates that no clock pulses are to be concurrently provided in the clock signal.

Certain aspects disclosed herein may be useable to replace or supplement a serial bus protocol, such as an I2C, I3C, SPMI, and/or RFFE protocol, or point-to-point interfaces based on UARTs, line-multiplexed UARTs (LM-UARTs). Certain aspects are applicable to a serial bus operated in half-duplex mode or full-duplex mode. Certain aspects are applicable to point-to-point interfaces including UART-based interfaces, line multiplexed UART (LM-UART) interfaces. In some implementations, certain aspects disclosed herein may be deployed to support exchange of virtual GPIO (VGI) messages. Certain aspects are applicable to multipoint interfaces and/or interfaces operated in point-to-point mode.

Examples of Apparatus that Employ Serial Data Links

According to certain aspects of this disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
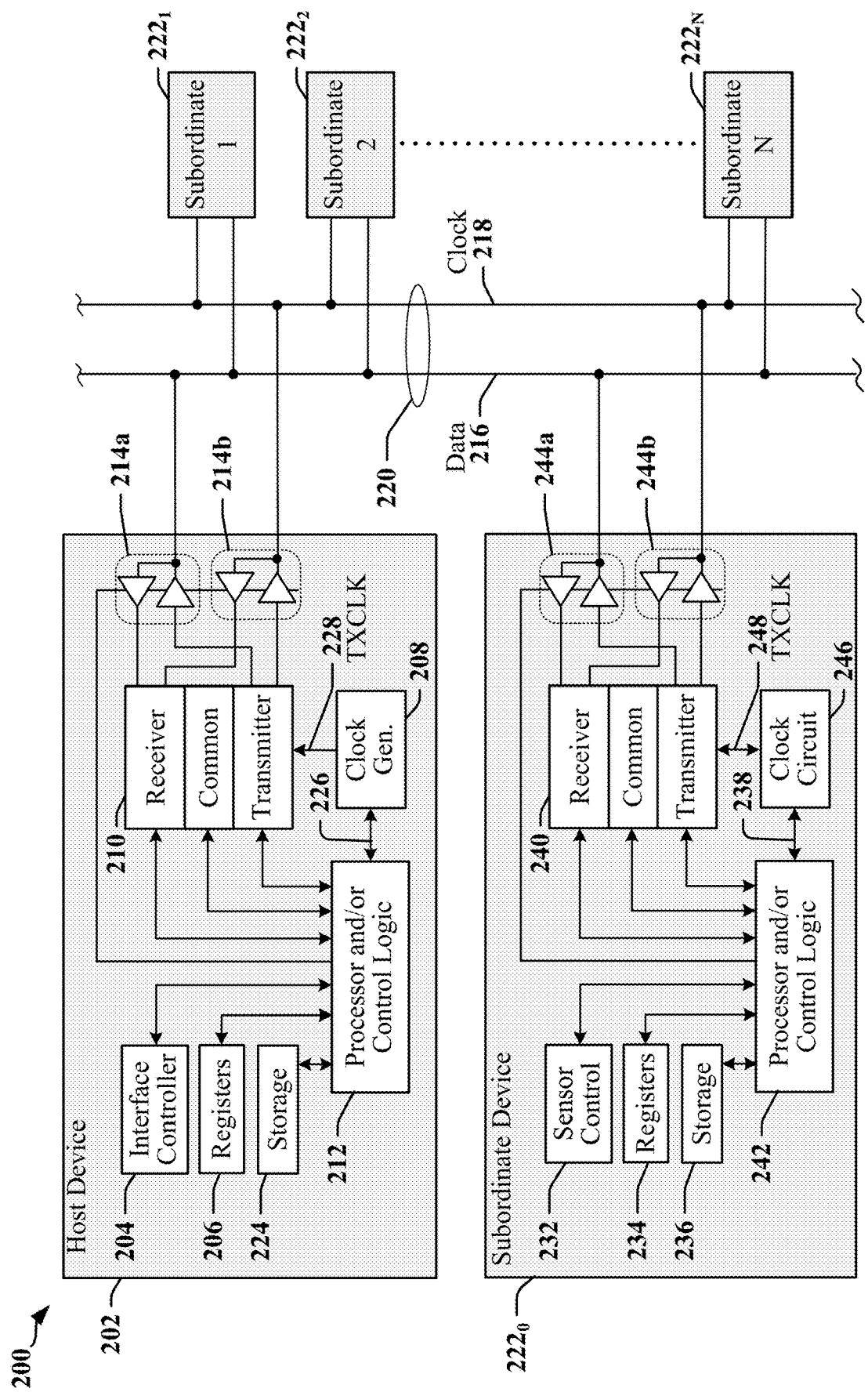
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an applications processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, RFFE devices and/or other such components or devices. In some examples, one or more of the subordinate devices $222_0$-$222_N$ may be used to control, manage or monitor a sensor device. Communication between devices 202 and $222_0$-$222_N$ over the serial bus 220 is controlled by a master device 202. Certain types of bus can support multiple master devices 202.

In one example, a master device 202 may include an interface controller 204 that manages access to the serial bus, configures dynamic addresses for subordinate devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a subordinate device on the serial bus 220 and may include circuits and modules that support a display, an image sensor, and/or circuits and modules that control and communicate with one or more sensors that measure environmental conditions. In one example, a subordinate device $222_0$ configured to operate as a subordinate device may provide a control function, module or circuit 232 that includes circuits and modules to support a display, an image sensor, and/or circuits and modules that control and communicate with one or more sensors that measure environmental conditions. The subordinate device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with RFFE, I2C, I3C, SPMI, or another protocol. At least one device 202, $222_0$-$222_N$ may be configured to selectively operate as either a master device or a subordinate device on the serial bus 220. Two or more devices 202, $222_0$-$222_N$ may be configurable to operate as a master device on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the two-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a two-wire serial bus 220 transmits data on a data line 216 and a clock signal on the clock line 218. In some instances, data may be encoded in the signaling state, or transitions in signaling state of the data line 216 and the clock line 218.

Figure 3:
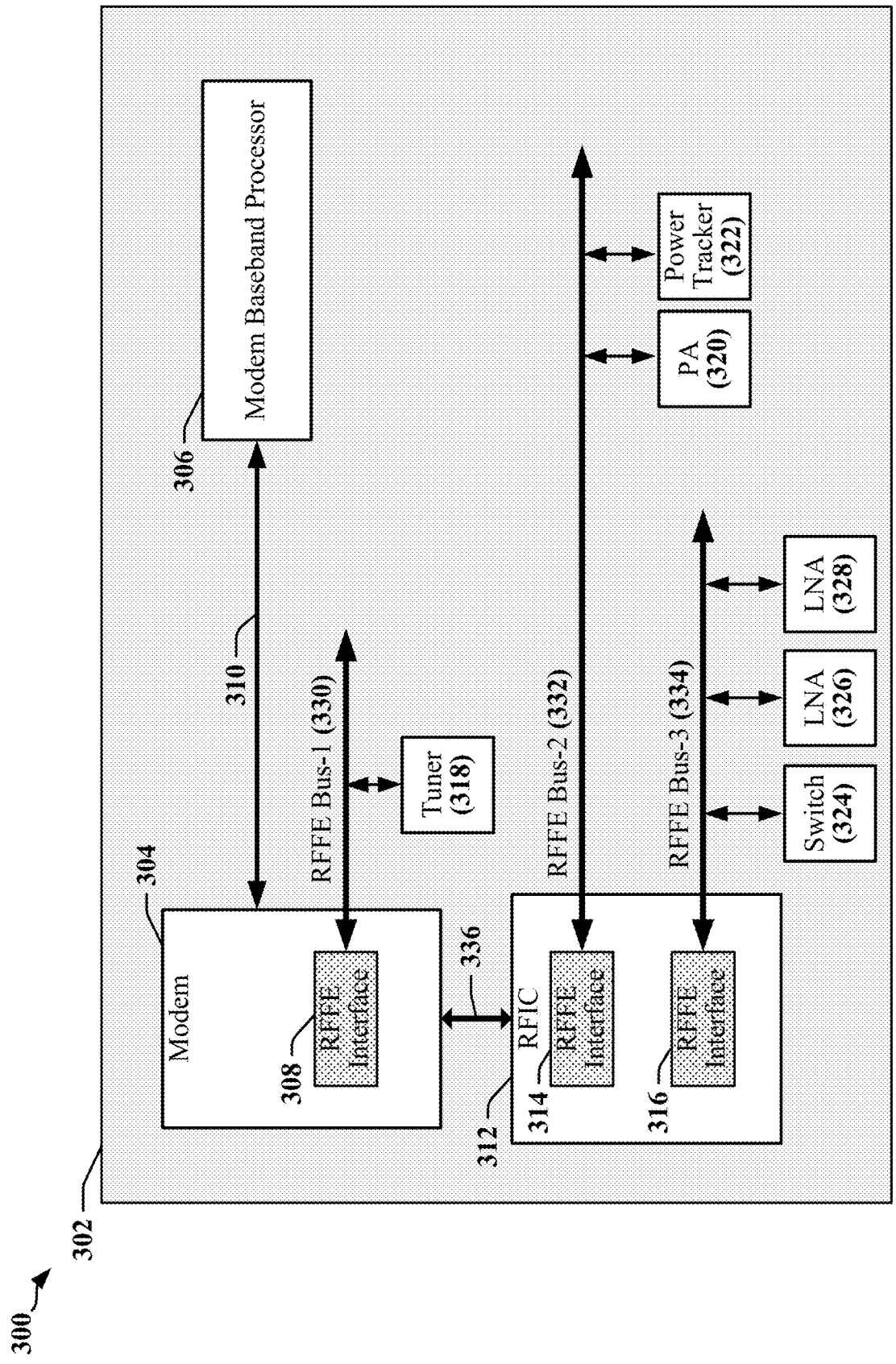
FIG. 3 illustrates a device configuration for coupling various radio frequency front-end devices using multiple RFFE buses.

FIG. 3 is a diagram 300 illustrating an example of a configuration of communication links in a chipset or device 302 that employs multiple RFFE buses 330, 332, 334 to couple various RF front-end devices 318, 320, 322, 324, 326 328. In this example, a modem 304 includes an RFFE interface 308 that couples the modem 304 to a first RFFE bus 330. The modem 304 may communicate with a baseband processor 306 and a Radio-Frequency IC (RFIC 312) through respective communication links 310, 336 or, in some implementations, through a common communication link 310 or 336. The illustrated device 302 may be embodied in one or more of a mobile communication device, a mobile telephone, a mobile computing system, a mobile telephone, a notebook computer, a tablet computing device, a media player, a gaming device, a wearable computing device, a wearable communication device, an appliance, or the like.

In various examples, the device 302 may be implemented with one or more baseband processors 306, modems 304, RFICs 312, multiple communication links 310, 336, multiple RFFE buses 330, 332, 334 and/or other types of buses. The device 302 may include other processors, circuits, modules and may be configured for various operations and/or different functionalities. In the example illustrated in FIG. 3, the modem 304 is coupled to an RF tuner 318 through its RFFE interface 308 and the first RFFE bus 330. The RFIC 312 may include one or more RFFE interfaces 314, 316, controllers, state machines and/or processors that configure and control certain aspects of the RF front-end. In the illustrated example, the RFIC 312 communicates with a PA 320 and a power tracking module 322 through a first of its RFFE interfaces 314 and the second RFFE bus 332. In the illustrated example, RFIC 312 communicates with a switch 324 and one or more LNAs 326, 328 through a second of its RFFE interfaces 316 and the third RFFE bus 334.

Bus latency can affect the ability of a serial bus to handle high-priority, real-time and/or other time-constrained messages. Low-latency messages, or messages requiring low bus latency, may relate to sensor status, device-generated real-time events and virtualized GPIO. In one example, bus latency can be measured as the time elapsed between a message becoming available for transmission and the delivery of the message. In another example, bus latency can be measured as the time elapsed between a message becoming available for transmission and commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In one example, latency-sensitive messages carry or include coexistence messages. Coexistence messages may be transmitted in a multisystem platform to prevent or reduce instances of certain types of RFFE device impinging on each other. RFFE devices that may be the source or subject of coexistence messages include, for example, switches 324, LNAs 326, 328, PAs 320 and other types of device that operate concurrently in a manner that generates inter-device RF interference, and/or that could potentially cause damage to one or more devices. Coexistence management messages may be exchanged between certain devices that are shared between different radio access technologies, wireless subscriptions and/or applications. For example, a switch 324, LNA 326, 328, PA 320 and/or an antenna may be shared by two different radio access technologies which have different transmit and receive schedules, and damage to an LNA 326, 328 or other device may occur if a device begins transmitting using one radio access technology while receiving using another radio access technology. Devices that can interfere with one another may exchange coexistence management (CxM) messages to permit each device to signal imminent actions that may result in interference or conflict. For example, two modems 304 may exchange CxM messages in order to manage the operation of shared components. In conventional systems CxM messages may be exchanged using dedicated serial links, each implemented using a two-wire or four-wire Universal Asynchronous Receiver/Transmitter (UART). In multi-radio, multi-application systems, the CxM interconnects and other device interconnects can consume large numbers of physical input/output (I/O) pins and interconnects adding to cost and routing complexity.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards.

In accordance with certain aspects disclosed herein, a two-wire serial bus may be adapted to operate alternately in a conventional two-wire mode and for a one-wire mode. In on example, the serial bus may be operated according to RFFE protocols such that the clock and data line are used for communication with two-wire subordinate devices coupled to the serial bus and the data line is used without a clock signal for communication with one-wire subordinate devices coupled to the serial bus. The host device may use pulse-width modulation to encode data transmitted to one-wire subordinate devices.

Figure 4:
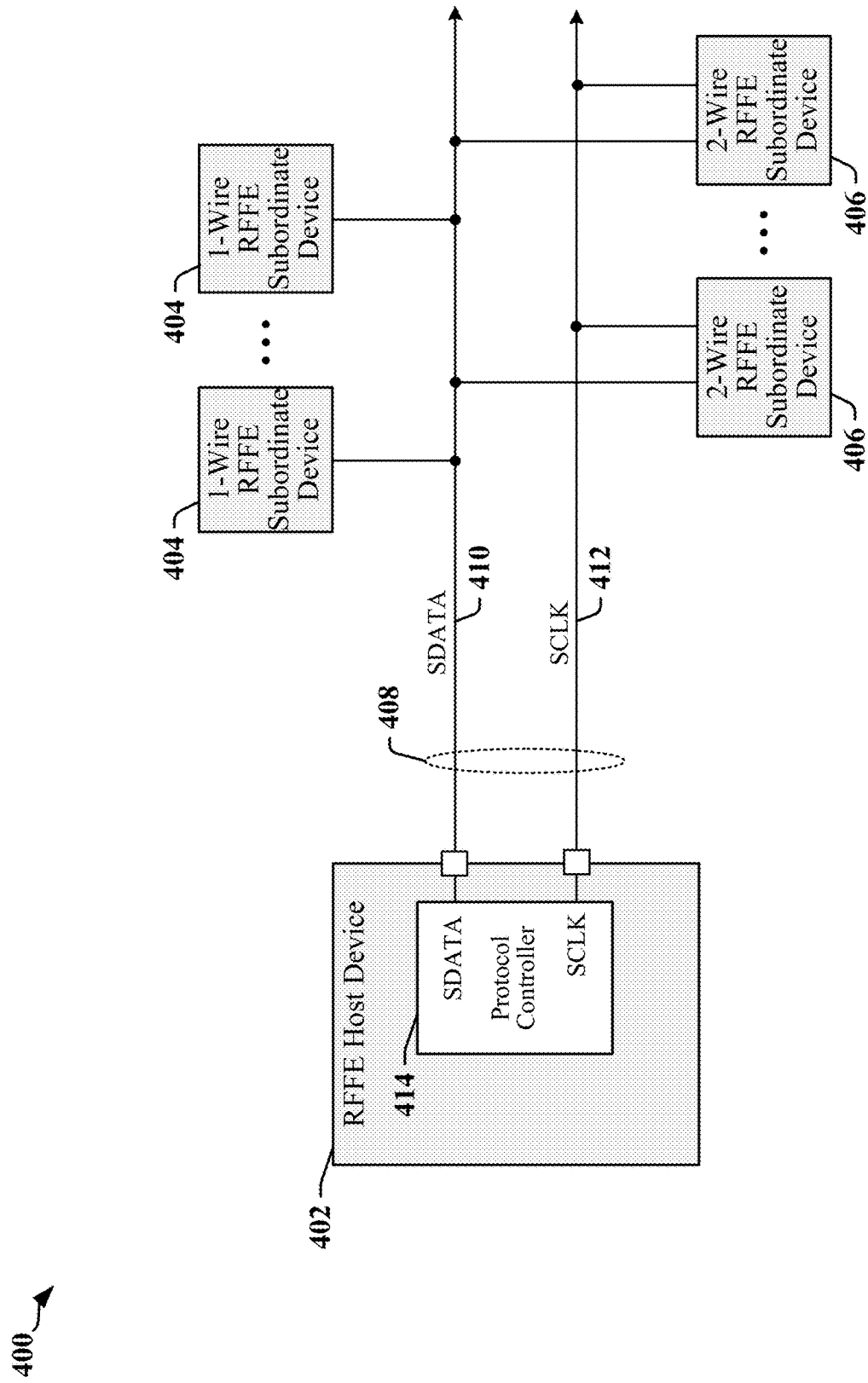
FIG. 4 illustrates a system in which one-wire subordinate devices and two-wire subordinate devices coexist in accordance with certain aspects disclosed herein.

FIG. 4 illustrates a system 400 in which one-wire subordinate devices 404 and two-wire subordinate devices 406 can coexist, and where a host device 402 can communicate with both the one-wire subordinate devices 404 and the two-wire subordinate devices 406 in accordance with certain aspects disclosed herein. The host device 402 may be provided in an RFIC, modem, application processor or another type of device. The host device 402 is coupled to one or more subordinate devices 404, 406 through at least the SDATA line 410 of a two-wire serial bus 408 that also has an SCLK line 412. Data can be encoded in a data signal transmitted over the SDATA line 410 and, in a two-wire mode of communication, a receiver can extract the data using a clock signal transmitted over the SCLK line 412. In the illustrated example, the serial bus 408 is operated in accordance with an RFFE protocol. In other examples, the serial bus 408 may be operated in accordance with another protocol, such as an I3C protocol, SPMI protocol or the like. In the illustrated example, each one-wire subordinate device 404 and each two-wire subordinate device 406 is coupled to the SDATA line 410. The one-wire subordinate devices 404 are adapted for a one-wire mode of communication, while the two-wire subordinate devices 406 are also coupled to the SCLK line 412 to receive the clock signal used in the two-wire mode of communication.

The host device 402 may include a protocol controller 414, which may be implemented by a processing circuit having a processor, controller, state machine or other logic. The protocol controller 414 may be configured to support one or more protocols that can be used to manage operation of the serial bus 408. In some implementations, the protocol controller 414 may be operable to configure one or more subordinate devices 404, 406. The protocol controller 414 may determine a configuration of a subordinate device 404, 406 that is a designated recipient of data to be transmitted over the serial bus 408, and may encode data in a signal to be transmitted over the SDATA line 410 accordingly. In some instances, a broadcast message directed to a combination of one-wire subordinate devices 404 and two-wire subordinate devices 406 may be sent twice, once in the one-wire mode of communication and once in the two-wire mode of communication. The protocol controller 414 may additionally determine whether and/or when a clock signal is to be transmitted over the SCLK line 412. In some implementations, the clock signal is suppressed when data is transmitted in the one-wire mode of communication to one or more one-wire subordinate devices 404.

According to certain aspects disclosed herein, the host device 402 may select between one-wire subordinate devices 404 and two-wire subordinate devices 406 when commencing a transaction. The host device 402 may use different sequence start conditions (SSCs) to precede one-wire and two-wire transactions. In some implementations, certain interface characteristics of the one-wire subordinate devices 404 and/or two-wire subordinate devices 406 may be configurable. For example, a one-wire subordinate device 404 and/or a two-wire subordinate device 406 coupled to the serial bus 408 may match a specified bus capacitance when driving the SDATA line 410 based on a configurable register setting that defines the capacitance specified for the SDATA line 410. In other instances, the specified bus capacitance can be hard-wired in the one-wire subordinate devices 404 and/or two-wire subordinate devices 406.

Figure 5:
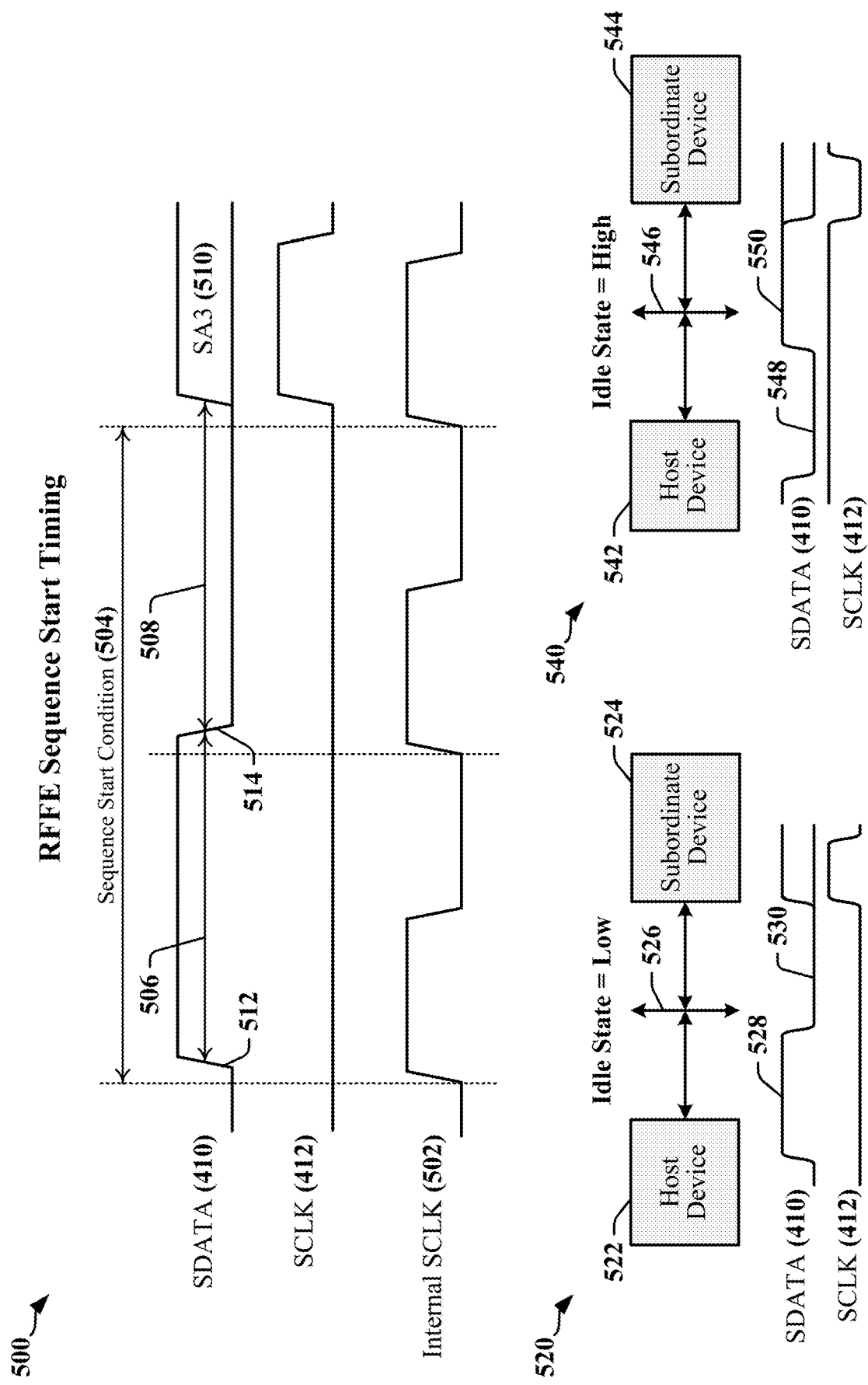
FIG. 5 illustrates a sequence start condition defined by RFFE protocols.

FIG. 5 illustrates RFFE sequence start timing 500 that includes an SSC 504 defined by RFFE protocols. With continued reference to FIG. 4, the serial bus 408 is initially in an idle state, where both the SDATA line 410 and the SCLK line 412 are low. A host device 402 may initiate a transaction by transmitting a two-bit SSC 504. Bit-time, or the transmission time of each bit, may be determined by the frequency of an internal clock 502 used by the host device 402. The internal clock 502 may be selected to control bitrate of the serial bus 408 during data transmission. The SSC 504 includes a pulse transmitted on the SDATA line 410 while the SCLK line 412 remains low. The pulse includes a one-bit high portion 506 and is followed by a one-bit low portion 508. The SSC 504 may be followed by a slave address 510. In conventional RFFE operation, information bits, including payload data, address and control bits, are sampled or captured when a clock pulse is provided on the SCLK line 412. No clock pulse is provided during transmission of the SSC 504, and a receiving device recognizes that the transitions in signaling state on the SDATA line 410 indicate control signaling when the SCLK line 412 remains low.

Various aspects of the SSC 504 are defined by RFFE protocols, including the durations of the high portion 506 and the low portion 508 of the SSC 504. The rise time ($T_R$) of the leading transition 512 and the fall time ($T_F$) of the pulse-terminating transition 514 are also defined by protocol. Limits on the frequency of the clock signal transmitted on the SCLK line 412 may be defined by design, application, and/or by specifications defining RFFE protocols. A protocol controller 414 may be configured to transmit a modified SSC that indicates when a transaction is to be conducted with a one-wire subordinate device 404. In certain examples, the protocol controller 414 may transmit an extended-length SSC to target a one-wire subordinate device 404 for communication and/or to indicate that the transaction is to be conducted in a one-wire mode of communication, where the extended-length SSC has a duration that is greater than the duration of an SSC pulse provided in accordance with RFFE specifications. In some implementations, the protocol controller 414 may transmit a shortened SSC to target a one-wire subordinate device 404 for communication, where the shortened SSC includes a pulse with a duration that is less than the duration of an SSC pulse provided in accordance with RFFE specifications. In some instances, the protocol controller 414 may transmit an SSC with modified rise time and/or fall time to target a one-wire subordinate device 404 for communication.

According to certain aspects, legacy two-wire datagrams are identified by a conventional SSC 504 that indicates that signaling is to be provided on both the SDATA line 410 and the SCLK line 412. One-wire datagrams may be identified by an SSC that includes a unique pulse timing signature on the SDATA line 410. In one example, a unique pulse timing signature is provided when the SSC pulse has a duration guaranteed to exceed the high portion 506 of the conventional SSC 504 (the pulse duration). In another example, the unique pulse timing signatures include transitions with modified rise time ($T_R$) and fall time ($T_F$), where receivers are equipped with slope detection circuits. In various implementations, a modified SSC for one-wire datagrams provides timing and/or control information that configures a receiver for the modulation scheme used on the SDATA line 410. In one example, the modified SSC for one-wire datagrams indicates the duration of a bit interval and/or the center point of the bit interval. In some examples, signaling in a clock period that follows the modified SSC indicates the duration of the bit interval and/or the center point of the bit interval.

In various implementations, the voltage level that defines idle state of the bus may be configurable or may change from implementation to implementation. In some examples, the SDATA line 410 and the SCLK line 412 are at a low voltage (or zero volts) in the idle state, while in others the SDATA line 410 and the SCLK line 412 are at a high voltage level in the idle state. The voltage level of the idle state may define the voltage level of the pulses transmitted in pulse-width modulated data signals, and/or the direction of transitions used to represent data in phase-modulated data signals. FIG. 5 includes generalized examples of systems 520, 540 that operate with different idle states. In the first system 520, a host device 522 communicates with a subordinate device 524 over a serial bus 526 in which the idle state is defined by a low voltage level 530 while active pulses rise to a higher voltage level 528. The serial bus 526 may be a one-wire bus, a two-wire bus, or a bus with multiple data lines. In some instances, the number of wires in the serial bus 526 is configurable, and the host device 522 and subordinate device 524 may have configurable general-purpose input/output (GPIO) pins that can be configured to match the configuration of the serial bus 526. In some implementations, the host device 522 and/or the subordinate device 524 may have a predefined GPIO configuration. In certain implementations, a host device 522 may be designed with GPIO pads and/or pins that can support operation in one-wire, two-wire, or mixed one-wire/two-wire applications.

In the second system 540, a host device 542 communicates with a subordinate device 544 over a serial bus 546 in which the idle state is defined by a high voltage level 550 while active pulses fall to a lower voltage level 548. The serial bus 546 may be a one-wire bus, a two-wire bus, or a bus with multiple data lines. In some instances, the number of wires in the serial bus 546 is configurable, and the host device 542 and subordinate device 544 may have configurable general-purpose input/output (GPIO) pins that can be configured to match the configuration of the serial bus 546. In some implementations, the host device 542 and/or the subordinate device 544 may have a predefined GPIO configuration. In certain implementations, a host device 542 may be designed with GPIO pads and/or pins that can support operation in one-wire, two-wire, or mixed one-wire/two-wire applications.

Figure 6:
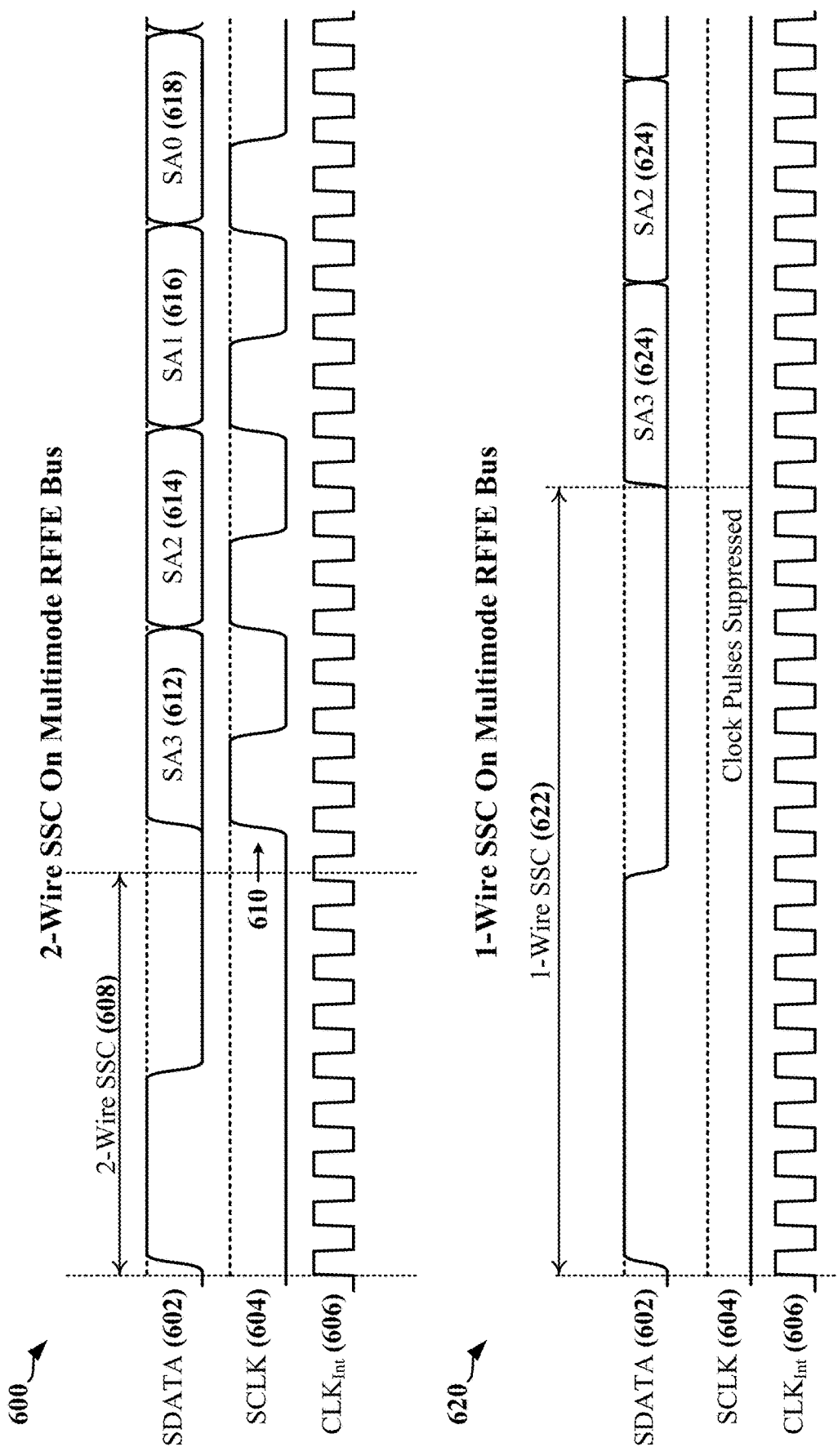
FIG. 6 illustrates examples of transactions conducted on a multi-mode serial bus in accordance with certain aspects disclosed herein.

FIG. 6 illustrates examples of transactions 600, 620 conducted on a multi-mode serial bus. In the first transactions 600, a two-wire SSC 608 is transmitted by the host device. The host device then transmits pulses 610 on the SCLK line 604 that indicate and/or differentiate data bits on the SDATA line 602. In the first transaction 600, a datagram is transmitted that commences with subordinate device address bits 612, 614, 616, 618. The two-wire SSC 608 is shorter in duration than the duration defined for a one-wire SSC, causing one-wire subordinate devices 404 to ignore the slave address bits 612, 614, 616, 618 and any subsequent data transmissions until a valid 1-bit SSC 622 is detected. In some implementations, a line interface circuit in the one-wire subordinate devices 404 provides a detect signal 606 that indicates whether a one-wire SSC has been detected.

In the second transaction 620, a one-wire SSC 622 is transmitted by the host device. The host device then gates, suppresses or otherwise refrains from transmitting pulses in the clock signal transmitted over the SCLK line 604. The host device transmits information on the SDATA line 602. In the second transaction 620, the information may commence with a subordinate device address bit 624. Two-wire subordinate devices 406 may be configured or adapted to ignore the slave address bit 624 when no pulses are provided on the SCLK line 604. A line interface circuit in the one-wire subordinate devices 404 provides a transition 626 to active state in the detect signal 606 when the one-wire SSC 622 has been detected.

A serial bus that couples both one-wire and two-wire subordinate devices to a host device may be referred to as a hybrid bus in this disclosure. Devices coupled to a hybrid bus may implement some combination of hardware and software to dynamically detect SSC duration and thereby identify an operating mode for an incoming transaction. The operating modes supported by devices coupled to a hybrid bus may include one-wire modes and two-wire modes. Devices coupled to a hybrid bus are typically configured to detect operating mode for every incoming transaction. In one example, a device coupled to a hybrid bus may implement dynamic transaction detection by measuring the duration (width) of each incoming SSC pulse. The duration of the SSC pulse can generally distinguish between one-wire and two-wire transactions. In one example, dynamic detection is implemented using an internal oscillator or clock generator operating at a multiple of the RFFE bus clock frequency. In some instances, the internal oscillator or clock generator outputs a clock signal that oscillates at four times (4×) the RFFE bus clock frequency.

For the purposes of this disclosure, a two-wire transaction is preceded by an SSC pulse that has a duration of one RFFE transmit clock cycle, and a one-wire transaction is preceded by an SSC pulse that has a duration of three or more RFFE transmit clock cycles. One-wire transactions conducted over the RFFE bus can be processed by devices that have one-wire capability. Two-wire transactions conducted over the RFFE bus can be processed by devices that have two-wire capability. Transactions can be processed by a device that has a unique identifier ("Device ID") that matches an address field in a command transmitted in the transaction. A device that has a Device ID that does not match the address field in a command transmitted in the transaction may ignore the command ignored and monitor the data line for the next incoming command.

Figure 7:
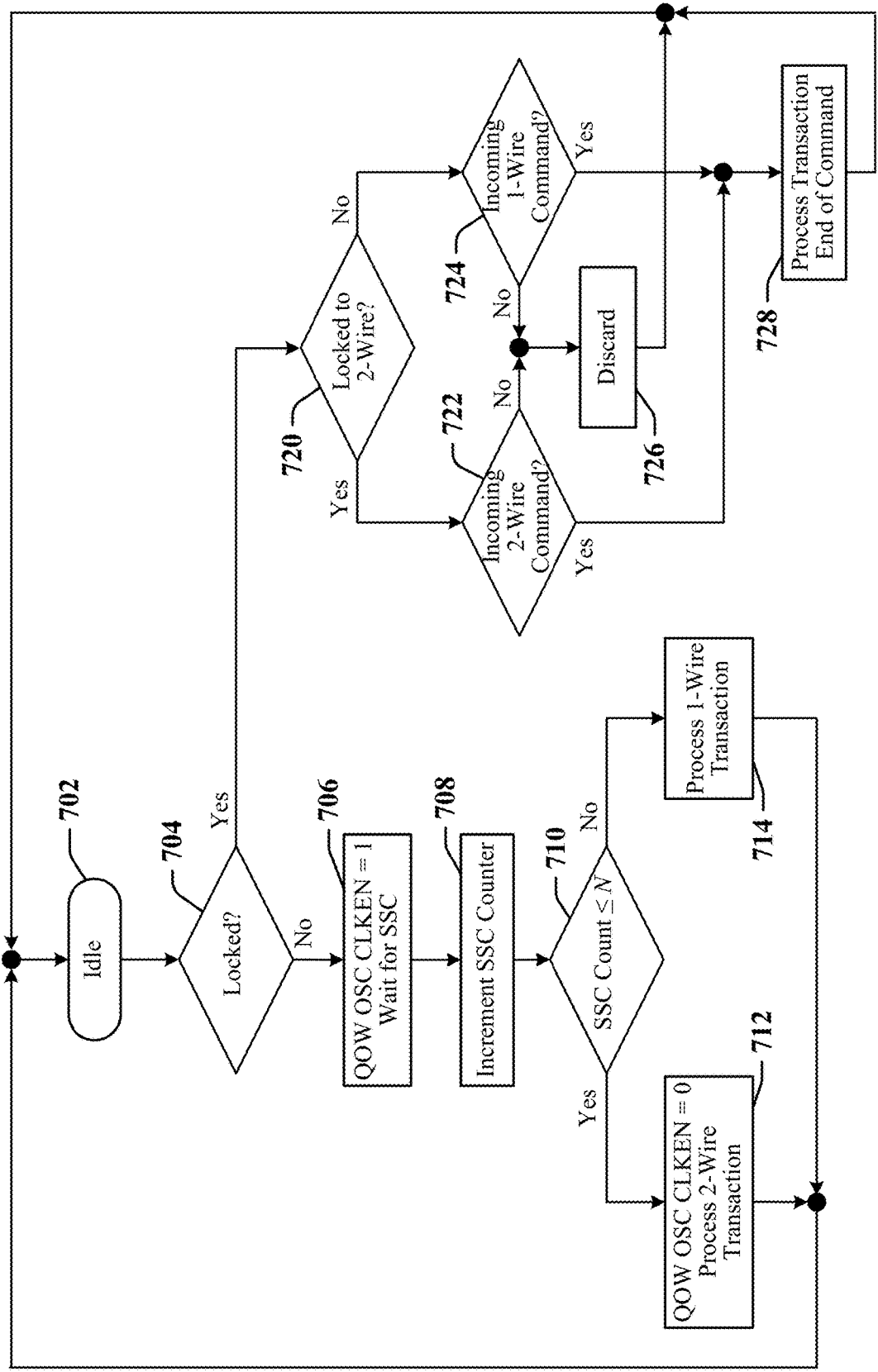
FIG. 7 is a flow diagram illustrating an example of communication in a device coupled to a hybrid bus that couples one-wire and two-wire subordinate devices to a host device.

FIG. 7 is a flow diagram 700 illustrating an example of communication in a device coupled to a hybrid bus that couples one-wire and two-wire subordinate devices to a host device. The system 400 illustrated in FIG. 4, for example, includes one-wire subordinate devices 404 and two-wire subordinate devices 406 that can coexist on the same bus when the control signaling illustrated in FIG. 6 is employed. In some instances, one or more of the two-wire subordinate devices 406 may be a dual-mode device that is capable of operating as a one-wire subordinate device. Dual-mode devices may be configurable to dynamically switch between one-wire and two-wire modes based on detected SSC structure and configuration. That is, a dual-mode device may be configurable to communicate using two-wire protocols when a conventional (shorter) SSC is detected and communicate using one-wire protocols when a longer SSC is detected. Dual-mode devices may be lockable in a selected or desired operating mode. In one example, the dual-mode device may be locked in one-wire mode in some circumstances and locked in two-wire mode in other circumstances. The dual-mode device may be locked or unlocked by a host device, an application, during system integration and/or during system configuration.

The dual-mode device may be in an idle state 702 when it detects the beginning of an SSC. In the idle state 702, the hybrid bus is either idle or the dual-mode device is waiting for the hybrid bus to become idle and/or remain idle for some minimum duration. Bus management protocols typically define the minimum duration that qualifies a bus idle condition. The dual-mode device can process the SSC and associated command or can effectively discard the command based on operational state of the dual-mode device. The dual-mode device may discard the command by ignoring the SSC and the datagram that follows the SSC until an idle period is detected on the serial bus. If the dual-mode device is an unlocked state, it will read the command and respond if the dual-mode device is addressed by the command. If the dual-mode device is in a two-wire locked state, it will process the SSC and the associated command when directed to two-wire devices and discard the command when directed to one-wire devices. If the dual-mode device is in a one-wire locked state, it will process the SSC and the associated command when directed to one-wire devices and discard the command when directed to two-wire devices.

Accordingly, at block 704, the dual-mode device determines if it has been locked and proceeds to block 706 when unlocked, or proceeds to block 720 when locked. At block 706, an unlocked dual-mode device enables its clock generator and enables a counter that may be configured to count cycles of an internal clock signal provided by the clock generator. The counter is incremented at block 708 in every cycle of the internal clock signal. The internal clock signal may have a frequency that is a multiple of the frequency of the transmitter clock in the host device. For the purposes of this description, a threshold counter value 'N' is used to distinguish between one-wire SSCs and two-wire SSCs. In one example, N may correspond to a counter value that is not reached before the two-wire SSC is terminated. In another example, N may correspond to a counter value that is not exceeded before the two-wire SSC is terminated. At block 710 in the illustrated example, the counter vale is compared to N after the SSC has been terminated. The dual-mode device proceeds to block 712 when the counter value does not exceed N, and proceeds to block 714 when the counter value exceeds N. At block 712, the dual-mode device disables its internal clock and participates in a two-wire transaction. At block 714, the dual-mode device uses its internal clock for data decoding purposes and participates in a one-wire transaction. After completing or abandoning a transaction the dual-mode device may reenter the idle state 702.

At block 720, a locked dual-mode device determines which mode is locked. The dual-mode device proceeds to block 722 when a two-wire lock is enabled and proceeds to block 724 when a one-wire lock is enabled. At block 722 the dual-mode device determines from the duration of the SSC whether the incoming command is directed to two-wire devices. The dual-mode device processes the transaction at block 728 when the incoming command is directed to two-wire devices and discards incoming commands directed to one-wire devices at block 726. At block 724 the dual-mode device determines from the duration of the SSC whether the incoming command is directed to one-wire devices. The dual-mode device processes the transaction at block 728 when the incoming command is directed to one-wire devices and discards incoming commands directed to two-wire devices at block 726. Upon discarding an incoming command at block 726 or processing a transaction at block 728, the dual-mode device may reenter the idle state 702.

According to certain aspects of this disclosure, a host device coupled to a hybrid serial bus can maintain separate addressing schemes for devices configured for two-wire mode transactions and devices configured for one-wire mode transactions. The ability to assign addresses independently for use in different modes of operating a hybrid bus can provide greater flexibility and increase the number of devices that can access the hybrid bus. In some examples, the use of separate addressing schemes can enable the number of addressable devices on a single RFFE bus to be doubled when the hybrid bus is shared by two-wire devices and one-wire RFFE devices.

Figure 8:
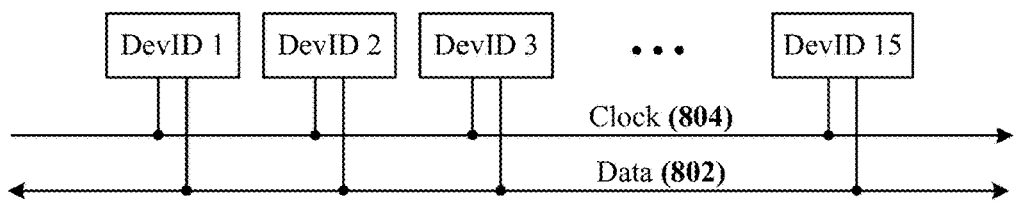
FIG. 8 illustrates certain aspects of addressing on a hybrid serial bus configured in accordance with certain aspects of this disclosure.
Figure 8:
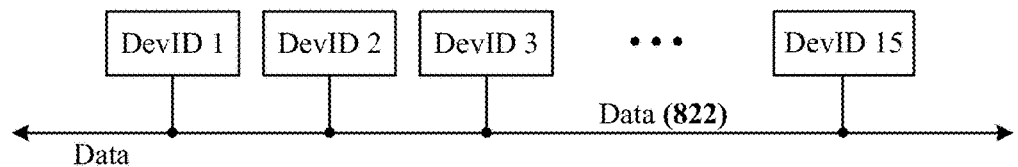
Figure 8:
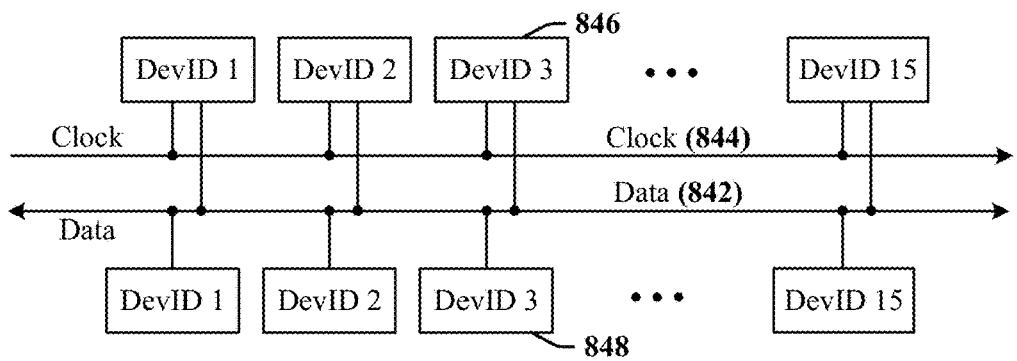

FIG. 8 illustrates certain aspects of addressing on a serial bus configured in accordance with certain aspects of this disclosure. In a first configuration 800, up to 15 RFFE devices configured for two-wire communication can be coupled to the data line 802 and clock line 804 provided by the serial bus. In a second configuration 820, up to 15 RFFE devices configured for one-wire communication can be coupled to the data line 822 provided by the serial bus. In both of these configurations 800, 820, each RFFE device is configured with a unique Device ID and the host device may maintain a single table associating each RFFE device with its assigned Device ID.

In the third configuration 840, up to 15 RFFE devices configured for two-wire communication can be coupled to the data line 842 and clock line 844 provided by the serial bus and up to 15 RFFE devices configured for one-wire communication can be coupled to the data line 842 of the serial bus. In this configuration 840, the Device ID assigned to each RFFE device may be assigned to one other RFFE device that operates in a different mode. The host device may maintain a table for each operating mode. One table may relate each RFFE devices configured for the two-wire operating mode with its assigned Device ID that is unique among two-wire RFFE devices, and a second table may relate each RFFE devices configured for the one-wire operating mode with its assigned Device ID that is unique among one-wire RFFE devices. In one example, two RFFE devices 846, 848 that share the same Device ID can be configured to operate in different operating modes at all times. The two RFFE devices 846, 848 need not have the same Device ID assigned.

In one aspect of this disclosure, the RFFE device 846 that is configured for two-wire operation may also be configurable for one-wire operation. The host device can assign two different addresses to this dual-mode RFFE device 846. For example, the dual-mode RFFE device 846 may be configured with a first Device ID for two-wire mode that matches the Device ID assigned to the one-wire RFFE device 848 and configured with a second Device ID for one-wire mode that is different from the first Device ID. In some instances, the dual-mode RFFE device 846 may be assigned two Device IDs that have the same value, whereby the dual-mode RFFE device 846 responds to the same address in two-wire and one-wire transactions.

The flexibility afforded the host device by the use of different addressing schemes for different operational modes can yield many advantages. In one example, a host device that maintains separate addresses for different operational modes in accordance with certain aspects of this disclosure may designate a particular 4-bit address for use by a two-wire device, a one-wire device or for both the two-wire device and the one-wire device. In another example, a single RFFE device may be assigned different priorities in different operational modes. In the latter example, different priorities can result in different behaviors and outcomes in address arbitration procedures performed in the different operating modes. In another example, the number of addressable devices that can be coupled to a single RFFE bus can be doubled.

An RFFE host device configured in accordance with certain aspects of this disclosure may maintain separate address and input/output (I/O) buffer space to manage communication with two-wire and one-wire RFFE devices that share a hybrid RFFE bus. Circuits in the RFFE host device can provide for automatic data traffic routing to and from the two-wire or one-wire buffer space on the host, based on the mode of communication enabled for the hybrid RFFE bus.

Figure 9:
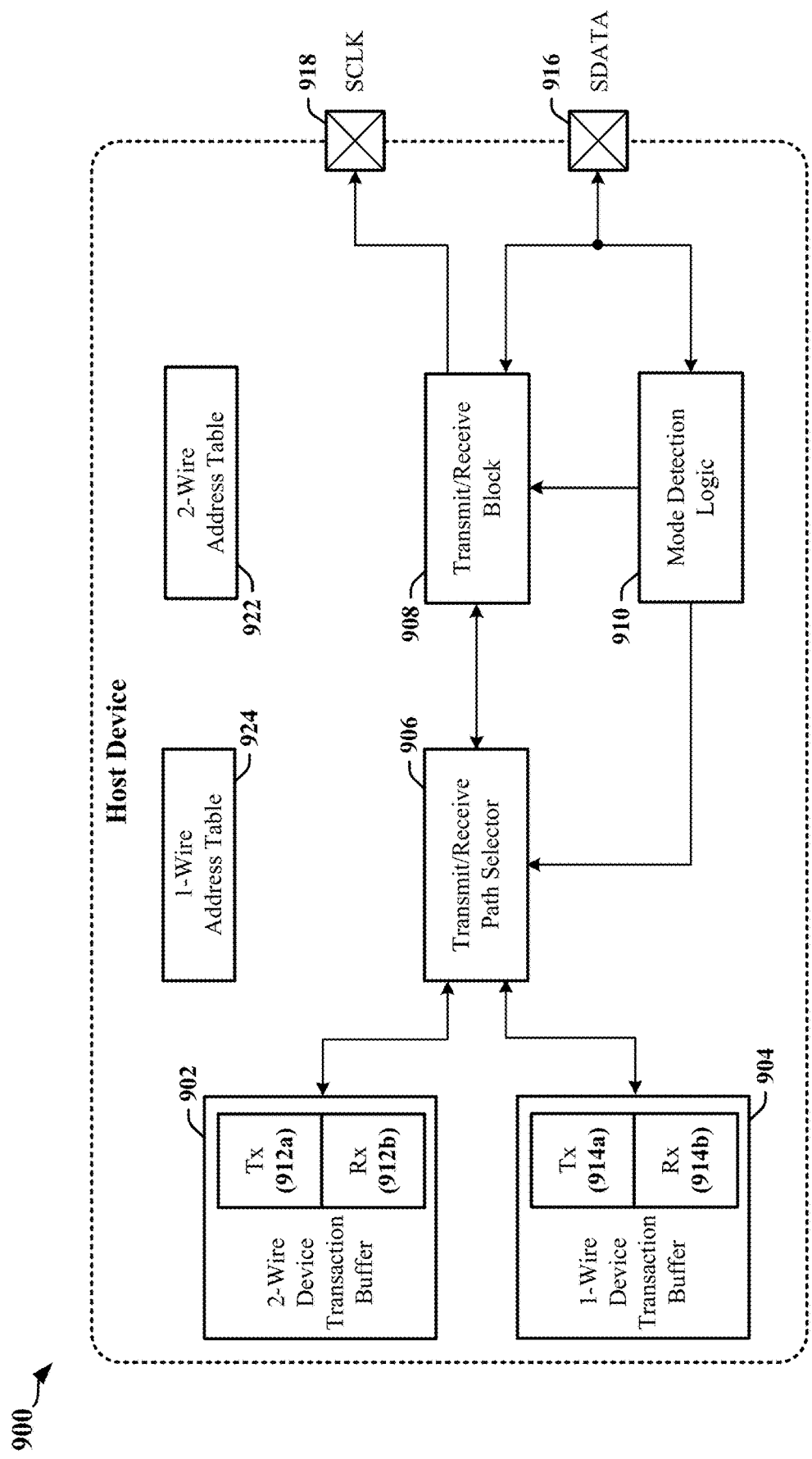
FIG. 9 illustrates a host device configured for managing communication over a hybrid serial bus in accordance with certain aspects of this disclosure.

FIG. 9 illustrates certain features of a host device 900 configured for managing communication over a hybrid serial bus in accordance with certain aspects of this disclosure. The host device 900 includes a set of two-wire transaction buffers 902 and a set of one-wire transaction buffers 904. A transmit buffer 912*a* in the two-wire transaction buffers 902 may be configured to provide a datastream to be transmitted in two-wire communication mode. A receive buffer 912*b* in the two-wire transaction buffers 902 may be configured to receive and/or assemble data received in transactions conducted in two-wire communication mode.

Mode detection logic 910 may determine the operating mode. The mode detection logic 910 may set the operating mode in response to SSC signaling detected on SDATA 916. In some implementations, the mode detection logic 910 may set the operating mode in response to input or commands from higher levels of the communication protocol implemented in the host device. For example, a component of the bus interface may set the two-wire operating mode when it determines that the destination for data provided by an application corresponds to a two-wire device. The two-wire transaction buffers 902 are enabled during the two-wire operating mode and path selector circuits 906 are configured to direct data flows between the two-wire transaction buffers 902 and the circuits in the transmit and receive circuits 908 that are used for two-wire transmissions. In some implementations, the transmit and receive circuits 908 may respond to the mode detection logic 910 by, for example, enabling a driver circuit to transmit a clock signal over SCLK 918.

A transmit buffer 914*a* in the one-wire transaction buffers 904 may be configured to provide a datastream to be transmitted in one-wire communication mode. A receive buffer 914*b* in the one-wire transaction buffers 904 may be configured to receive and/or assemble data received in transactions conducted in one-wire communication mode.

The mode detection logic 910 may set the operating mode in response to SSC signaling detected on SDATA 916. In some implementations, the mode detection logic 910 may set the operating mode in response to input or commands from higher levels of the communication protocol implemented in the host device. For example, a component of the bus interface may set the one-wire operating mode when it determines that the destination for data provided by an application corresponds to a one-wire device. The one-wire transaction buffers 904 are enabled during the one-wire operating mode and path selector circuits 906 are configured to direct data flows between the one-wire transaction buffers 904 and the circuits in the transmit and receive circuits 908 that are used for two-wire transmissions. In some implementations, the transmit and receive circuits 908 may respond to the mode detection logic 910 by, for example, disabling a driver circuit to prevent transmission of a clock signal over SCLK 918.

In certain implementations, the transmit and receive circuits 908 may include encoding circuits that can be used in one-wire mode to provide pulse-width modulated data signals, Manchester-encoded data signals or other encoded signals to be transmitted over SDATA 916.

The host device 900 may include multiple address tables 922, 924 that can be used to identify devices coupled to the hybrid serial bus. In the illustrated example, a first address table 922 relates Device IDs to corresponding devices that are configurable for operation in two-wire mode, and a second address table 924 relates Device IDs to corresponding devices that are configurable for operation in one-wire mode. One or more devices may be referenced in both address tables 922, 924. The address tables 922, 924 may be configured during manufacture, system integration, system initialization, by command issued by applications and/or dynamically by the host device 900. The use of multiple address tables 922, 924 can provide secure dual addressing for those devices that can support both two-wire and one-wire modes. In some implementations, dual-mode devices can have the same or different Device IDs for the two modes. Dual-mode devices may be configured to dynamically change operating mode and simultaneously change their active Device ID.

Operating mode changes in the bus interface of a subordinate device can be triggered by the duration of an SSC detected on the data line of a hybrid RFFE bus. A subordinate device configured in accordance with certain aspects of this disclosure may be configured to prevent detection of false SSCs caused by sequences of bits transmitted over the data line of the hybrid RFFE bus in one-wire mode. Subordinate devices operating in one-wire mode may be configured to ignore apparent SSCs that are not preceded by a bus idle period that exceeds the maximum length of continuous transmission of zeroes when the hybrid bus is operated in two-wire mode. Devices operating in two-wire mode are expected to ignore a false SSC when no clock signal is present on the hybrid RFFE bus.

Figure 10:
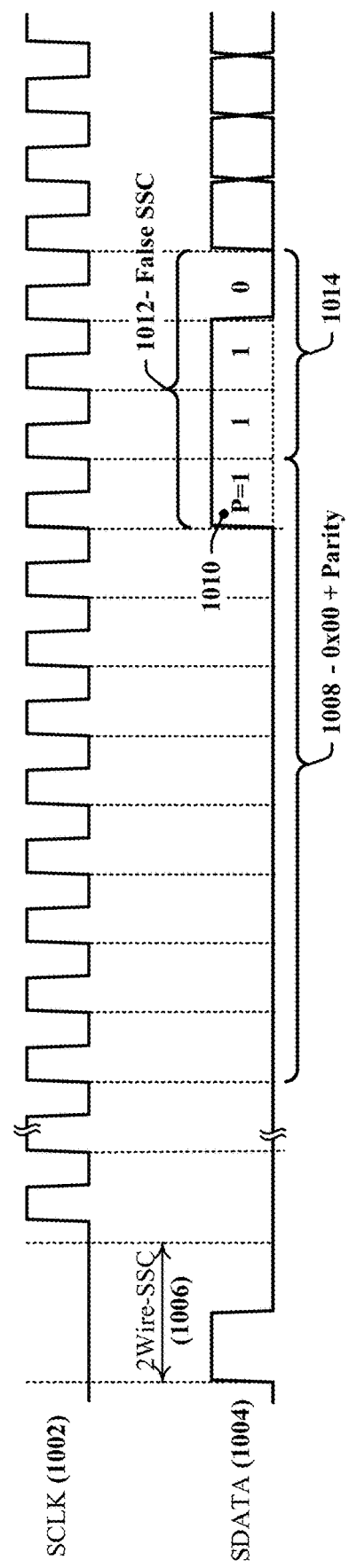
FIG. 10 illustrates a false two-wire SSC is transmitted on the data line of a serial bus configured in accordance with certain aspects of this disclosure.

FIG. 10 is a timing diagram 1000 that illustrates a false one-wire SSC 1012 transmitted on the data line of a serial bus configured in accordance with certain aspects of this disclosure. In the illustrated example a host device initially transmits a two-wire SSC 1006 on the SDATA line 1004 to initiate a two-wire transaction. A clock signal is provided on SCLK 1002, beginning after transmission of the two-wire SSC 1006. In the course of the transaction, a byte is transmitted with the value 0x00. A parity bit 1010 provides odd parity, resulting in a 9-bit transmission 1008 in which the SDATA line 1004 is low for at least 8 clock cycles before transitioning to the high state. The 8-bit 0x00 transmission meets or exceeds the minimum duration specified for a pulse on the SDATA qualifying as an SSC according to conventional RFFE protocols. After the parity bit 1010, the next 9-bit transmission commences with a pattern of bits 1014 that includes at least two bits of value '1' followed by a bit of value '0'. The combined parity bit 1010 and pattern of bits 1014 may be considered or referred to as a false one-wire SSC 1012.

In some implementations, one-wire subordinate devices may be configured or adapted in accordance with certain aspects of this disclosure to ignore transmissions of one-wire SSCs on the SDATA line 1004 that are not preceded by a predefined number of clock cycles. In one example, the number of clock cycles corresponds to 10 bit transmission intervals for a two-wire datagram. The number of clock cycles may be selected based on specific implementation details and other factors. In one example, the number of cycles may be increased or decreased based on the expected accuracy of the internal clock signal used by one-wire subordinate devices to measure durations of idle periods or SSC pulses. In another example, the number of cycles may be increased when certain fields may be transmitted in a two-wire datagram without parity. In another example, the number of cycles may be increased when even parity is used in a two-wire datagram.

Figure 11:
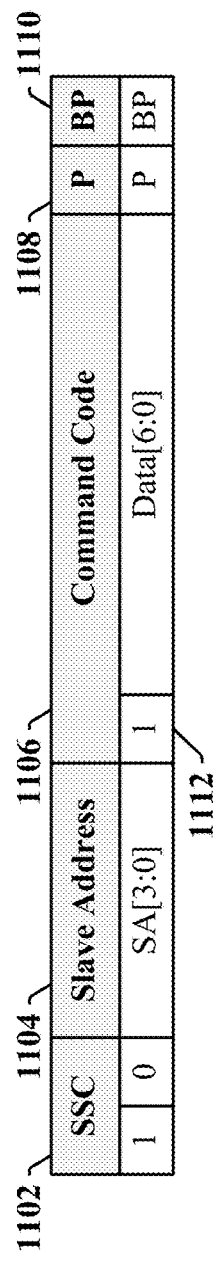
FIG. 11 illustrates datagram structures that may be compliant or compatible with RFFE protocols.
Figure 11:
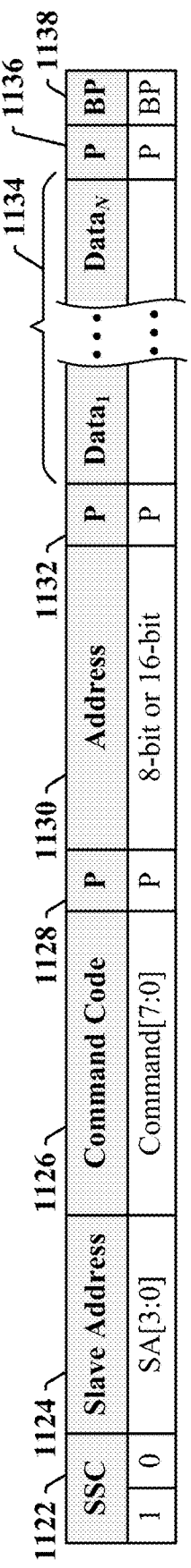

FIG. 11 illustrates datagrams 1100, 1120 that may comply, or be compatible with conventional RFFE protocols and transmitted in both one-wire and two-wire datagrams. The datagrams 1100, 1120 represent Write commands that may be transmitted in datagrams defined by RFFE protocols.

The first datagram 1100 corresponds to a Register 0 Write command that has limited data payload capacity. The datagram 1100 commences with transmission of a two-bit SSC 1102 followed by a slave address 1104 or other device identifier. In the first datagram 1100, the slave address 1104 has four bits. The 8-bit command field 1106 is transmitted next, with the first bit 1112 set to indicate that the command is a Register 0 Write command. The command field 1106 also carries a seven-bit data payload. In the first datagram 1100, the command field 1106 may include a parity bit 1108 and may be followed by bus park signaling 1110.

The datagram 1120 represents a generalized Write command that may be transmitted in datagrams defined by RFFE protocols. The datagram 1120 commences with transmission of a two-bit SSC 1122 followed by a four-bit slave address 1124 or another device identifier. The 8-bit command code 1126 is transmitted next. The command code 1126 may be followed by a parity bit 1128. An address field 1130 is transmitted, which can have an 8-bit length or a 11-bit length (for extended register write commands). The address field 1130 may be followed by a parity bit 1132. One or more data frames 1134 may be transmitted, each with an accompanying parity bit 1136. A bus park condition (BPC 1138) terminates the datagram 1120. Each of the data frames 1134 may include an 8-bit byte with parity 1136.

Examples of Processing Circuits and Methods

Figure 12:
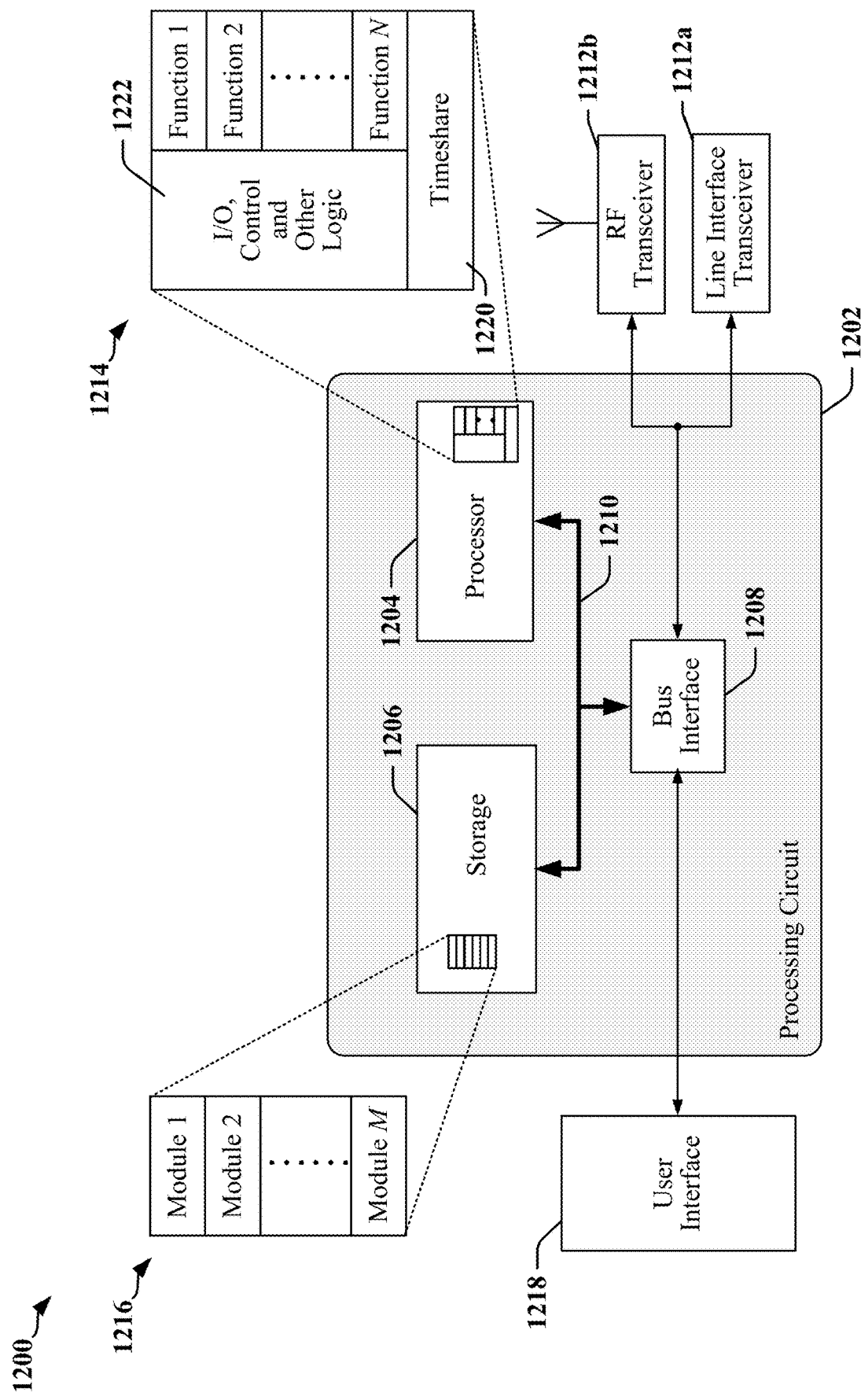
FIG. 12 illustrates one example of an apparatus employing a processing circuit that may be adapted according to certain aspects disclosed herein.

FIG. 12 is a diagram illustrating an example of a hardware implementation for an apparatus 1200. In some examples, the apparatus 1200 may perform one or more functions disclosed herein. In accordance with various aspects of the disclosure, an element, or any portion of an element, or any combination of elements as disclosed herein may be implemented using a processing circuit 1202. The processing circuit 1202 may include one or more processors 1204 that are controlled by some combination of hardware and software modules. Examples of processors 1204 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more transceivers 1212a, 1212b. A transceiver 1212a, 1212b may be provided for each networking technology supported by the processing circuit. In some instances, multiple networking technologies may share some or all of the circuitry or processing modules found in a transceiver 1212a, 1212b. Each transceiver 1212a, 1212b provides a means for communicating with various other apparatus over a transmission medium. In one example, a transceiver 1212a may be used to couple the apparatus 1200 to a multi-wire bus. In another example, a transceiver 1212b may be used to connect the apparatus 1200 to a radio access network. Depending upon the nature of the apparatus 1200, a user interface 1218 (e.g., keypad, display, speaker, microphone, joystick) may also be provided, and may be communicatively coupled to the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer-readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as a transceiver 1212a, 1212b, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to a transceiver 1212a, 1212b, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the transceiver 1212a, 1212b, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

Methods for optimizing virtual GPIO latency may include an act of parsing various input sources including sources of GPIO signal state, parameters and/or messages to be transmitted. The input sources may include hardware events, configuration data, mask parameters, and register addresses. Packet-specific latency estimators may be employed to estimate the latency for corresponding packet types based upon the parsed parameters. A packet type to be used for transmission may be selected based on the minimum latency calculated or determined for available packet types. The selected packet type may be identified using a command code, which may be provided to a packetizer with a payload to be transmitted. The command code may also reflect a protocol to be used to transmit the payload. In some implementations, the physical link used to transmit the payload may be operated according to different protocols or different variants of one or more protocols. The protocol to be used for transmitting the payload may be selected based on latencies associated with the various available protocols or variants of protocols.

Figure 13:
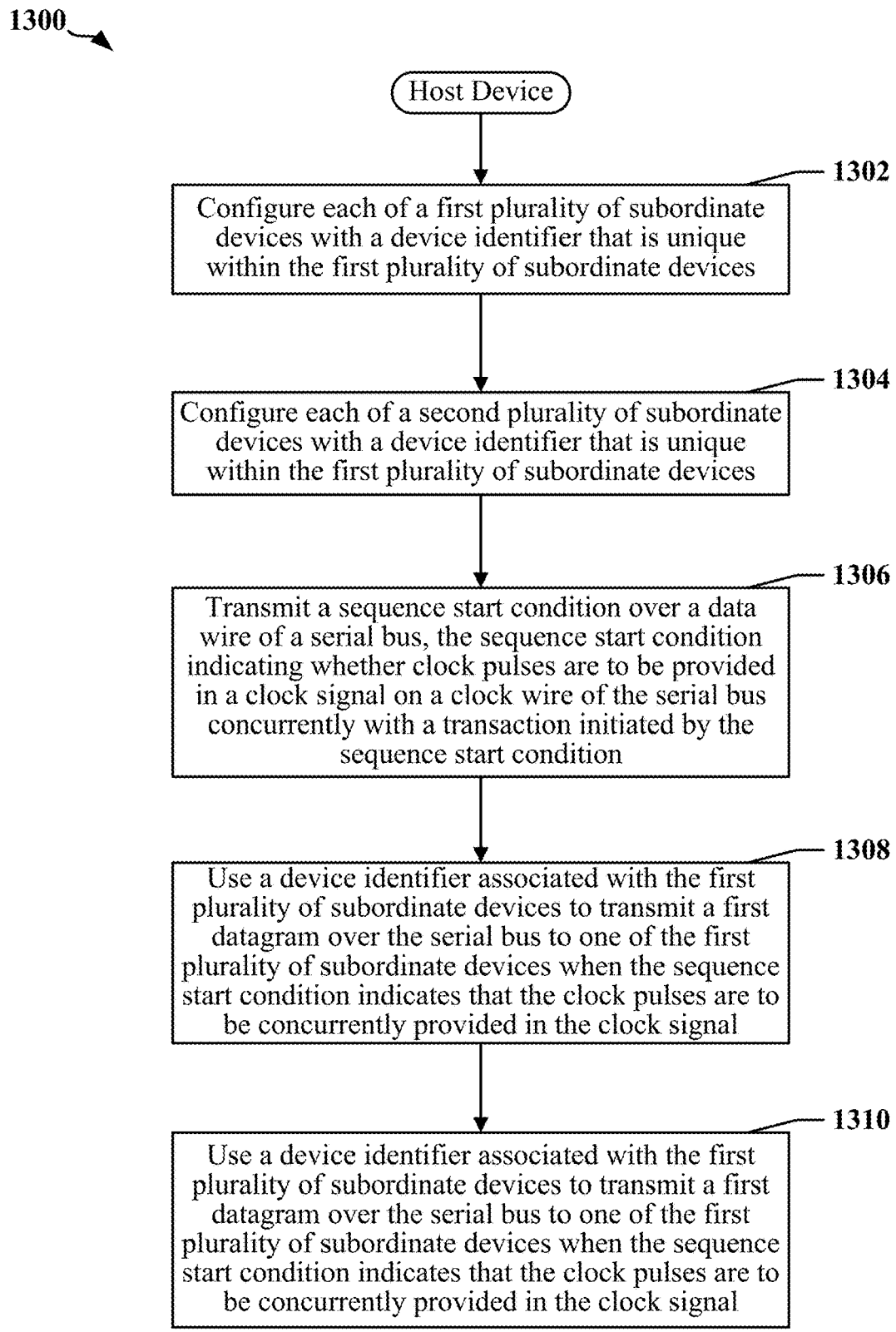
FIG. 13 is a flowchart that illustrates a method for data communication at a master device in accordance with certain aspects disclosed herein.

FIG. 13 is a flowchart 1300 of a method that may be performed by a host device coupled to a serial bus. One or more one-wire subordinate devices and one or more two-wire subordinate devices may be coupled to the serial bus.

At block 1302, the host device may configure each of a first plurality of subordinate devices with a device identifier that is unique within the first plurality of subordinate devices. At block 1304, the host device may configure each of a second plurality of subordinate devices with a device identifier that is unique within the second plurality of subordinate devices. At block 1306, the host device may transmit a sequence start condition over a data wire of the serial bus, the sequence start condition indicating whether clock pulses are to be provided in a clock signal on a clock wire of the serial bus concurrently with a transaction initiated by the sequence start condition. At block 1308, the host device may use a device identifier associated with the first plurality of subordinate devices to transmit a first datagram over the serial bus to one of the first plurality of subordinate devices when the sequence start condition indicates that the clock pulses are to be concurrently provided in the clock signal. At block 1310, the host device may use a device identifier associated with the second plurality of subordinate devices to transmit a second datagram over the serial bus to one of the second plurality of subordinate devices when the sequence start condition indicates that no clock pulses are to be concurrently provided in the clock signal. In some instances, one of the first plurality of subordinate devices and one of the second plurality of subordinate devices have a same device identifier.

In certain examples, a dual-mode subordinate device is included in the first plurality of subordinate devices and in the second plurality of subordinate devices. The host device may configure the dual-mode subordinate device with a first device identifier that is associated with the first plurality of subordinate devices and used by the dual-mode subordinate device for communicating over the serial bus when the sequence start condition indicates that the clock pulses are to be concurrently provided in the clock signal. The host device may configure the dual-mode subordinate device with a second device identifier that is associated with the second plurality of subordinate devices and used by the dual-mode subordinate device for communicating over the serial bus when the sequence start condition indicates that no clock pulses are to be concurrently provided in the clock signal. In some examples, the first device identifier has the same value as the second device identifier. In some examples, the first device identifier and the second device identifier have different values.

In some implementations, the sequence start condition has a first duration when indicating that the clock pulses are to be concurrently provided in the clock signal and a second duration longer than the first duration when indicating that no clock pulses are to be concurrently provided in the clock signal.

In certain implementations, the host device may configure each of the second plurality of subordinate devices to ignore the sequence start condition unless the sequence start condition is preceded by an idle period that has a minimum duration calculated based on transmission time of a data byte transmitted over the serial bus.

Figure 14:
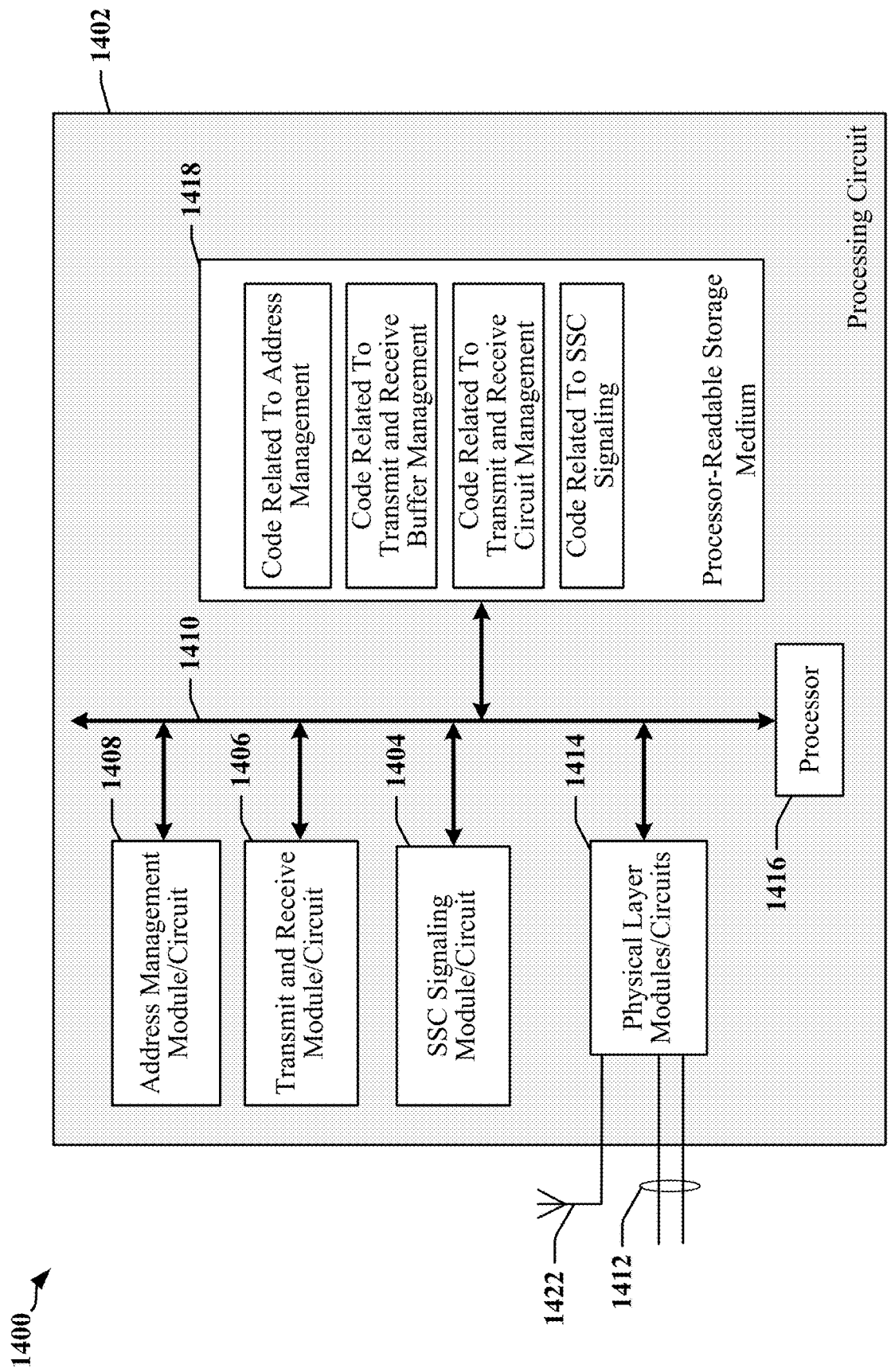
FIG. 14 illustrates an example of a hardware implementation for a host device apparatus adapted in accordance with certain aspects disclosed herein.

FIG. 14 is a diagram illustrating a simplified example of a hardware implementation for an apparatus 1400 employing a processing circuit 1402. The processing circuit typically has a controller or processor 1416 that may include one or more microprocessors, microcontrollers, digital signal processors, sequencers and/or state machines. The processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including one or more processors and/or hardware modules, represented by the controller or processor 1416, the modules or circuits 1404, 1406 and 1408 and the processor-readable storage medium 1418. One or more physical layer circuits and/or modules 1414 may be provided to support communications over a communication link implemented using a multi-wire bus 1412, through an antenna or antenna array 1422 (to a radio access network for example), and so on. The bus 1410 may also link various other circuits such as timing sources, peripherals, voltage regulators, and power management circuits, which are well known in the art, and therefore, will not be described any further.

The processor 1416 is responsible for general processing, including the execution of software, code and/or instructions stored on the processor-readable storage medium 1418. The processor-readable storage medium may include a non-transitory storage medium.

The software, when executed by the processor 1416, causes the processing circuit 1402 to perform the various functions described supra for any particular apparatus. The processor-readable storage medium may be used for storing data that is manipulated by the processor 1416 when executing software. The processing circuit 1402 further includes at least one of the modules 1404, 1406 and 1408. The modules 1404, 1406 and 1408 may be software modules running in the processor 1416, resident/stored in the processor-readable storage medium 1418, one or more hardware modules coupled to the processor 1416, or some combination thereof. The modules 1404, 1406 and 1408 may include microcontroller instructions, state machine configuration parameters, or some combination thereof.

In one configuration, the apparatus 1400 includes modules and/or circuits 1404 adapted to provide SSCs that indicate whether a one-wire transaction or a two-wire transaction is to be conducted over the serial bus. The apparatus 1400 may include modules and/or circuits 1406 adapted to encode, decode, transmit and receive data, and modules and/or circuits 1408 adapted to manage multiple address tables that maintain Device IDs and to cause Device IDs to be assigned to one-wire and two-wire subordinate devices.

In one example, the apparatus 1400 includes physical layer circuits and/or modules 1414 that implement an interface circuit adapted to couple the apparatus 1400 to two wires of a serial bus. The apparatus 1400 may have a protocol controller configured to configure each of a first plurality of subordinate devices with a device identifier that is unique within the first plurality of subordinate devices, configure each of a second plurality of subordinate devices with a device identifier that is unique within the second plurality of subordinate devices; transmit a sequence start condition over a data wire of the serial bus, the sequence start condition indicating whether clock pulses are to be provided in a clock signal on a clock wire of the serial bus concurrently with a transaction initiated by the sequence start condition; use a device identifier associated with the first plurality of subordinate devices to transmit a first datagram over the serial bus to one of the first plurality of subordinate devices when the sequence start condition indicates that the clock pulses are to be concurrently provided in the clock signal; and use a device identifier associated with the second plurality of subordinate devices to transmit a second datagram over the serial bus to one of the second plurality of subordinate devices when the sequence start condition indicates that no clock pulses are to be concurrently provided in the clock signal.

In one example, one of the first plurality of subordinate devices and one of the second plurality of subordinate devices have a same device identifier.

In certain examples, a dual-mode subordinate device is included in the first plurality of subordinate devices and in the second plurality of subordinate devices. The protocol controller may be further configured to configure the dual-mode subordinate device with a first device identifier that is associated with the first plurality of subordinate devices and used by the dual-mode subordinate device for communicating over the serial bus when the sequence start condition indicates that the clock pulses are to be concurrently provided in the clock signal; and configure the dual-mode subordinate device with a second device identifier that is associated with the second plurality of subordinate devices and used by the dual-mode subordinate device for communicating over the serial bus when the sequence start condition indicates that no clock pulses are to be concurrently provided in the clock signal. The first device identifier may have the same value as the second device identifier or may have different values.

In some implementations, the sequence start condition has a first duration when indicating that the clock pulses are to be concurrently provided in the clock signal and a second duration longer than the first duration when indicating that no clock pulses are to be concurrently provided in the clock signal.

In some implementations, the protocol controller is further configured to configure each of the second plurality of subordinate devices to ignore the sequence start condition unless the sequence start condition is preceded by an idle period that has a minimum duration calculated based on transmission time of a data byte transmitted over the serial bus.

The processor-readable storage medium 1418 may include transitory or non-transitory storage devices configured to store code, instructions and/or parameters used to implement one or more methods or procedures disclosed herein. The processor-readable storage medium 1418 may include code for configuring each of a first plurality of subordinate devices with a device identifier that is unique within the first plurality of subordinate devices; configuring each of a second plurality of subordinate devices with a device identifier that is unique within the second plurality of subordinate devices; transmitting a sequence start condition over a data wire of a serial bus, the sequence start condition indicating whether clock pulses are to be provided in a clock signal on a clock wire of the serial bus concurrently with a transaction initiated by the sequence start condition; using a device identifier associated with the first plurality of subordinate devices to transmit a first datagram over the serial bus to one of the first plurality of subordinate devices when the sequence start condition indicates that the clock pulses are to be concurrently provided in the clock signal; and using a device identifier associated with the second plurality of subordinate devices to transmit a second datagram over the serial bus to one of the second plurality of subordinate devices when the sequence start condition indicates that no clock pulses are to be concurrently provided in the clock signal.

In some implementations, the processor-readable storage medium 1418 includes code for configuring the dual-mode subordinate device with a first device identifier that is associated with the first plurality of subordinate devices and used by the dual-mode subordinate device for communicating over the serial bus when the sequence start condition indicates that the clock pulses are to be concurrently provided in the clock signal; and configuring the dual-mode subordinate device with a second device identifier that is associated with the second plurality of subordinate devices and used by the dual-mode subordinate device for communicating over the serial bus when the sequence start condition indicates that no clock pulses are to be concurrently provided in the clock signal.

In some implementations, the processor-readable storage medium 1418 includes code for configuring each of the second plurality of subordinate devices to ignore the sequence start condition unless the sequence start condition is preceded by an idle period that has a minimum duration calculated based on transmission time of a data byte transmitted over the serial bus.

Figure 15:
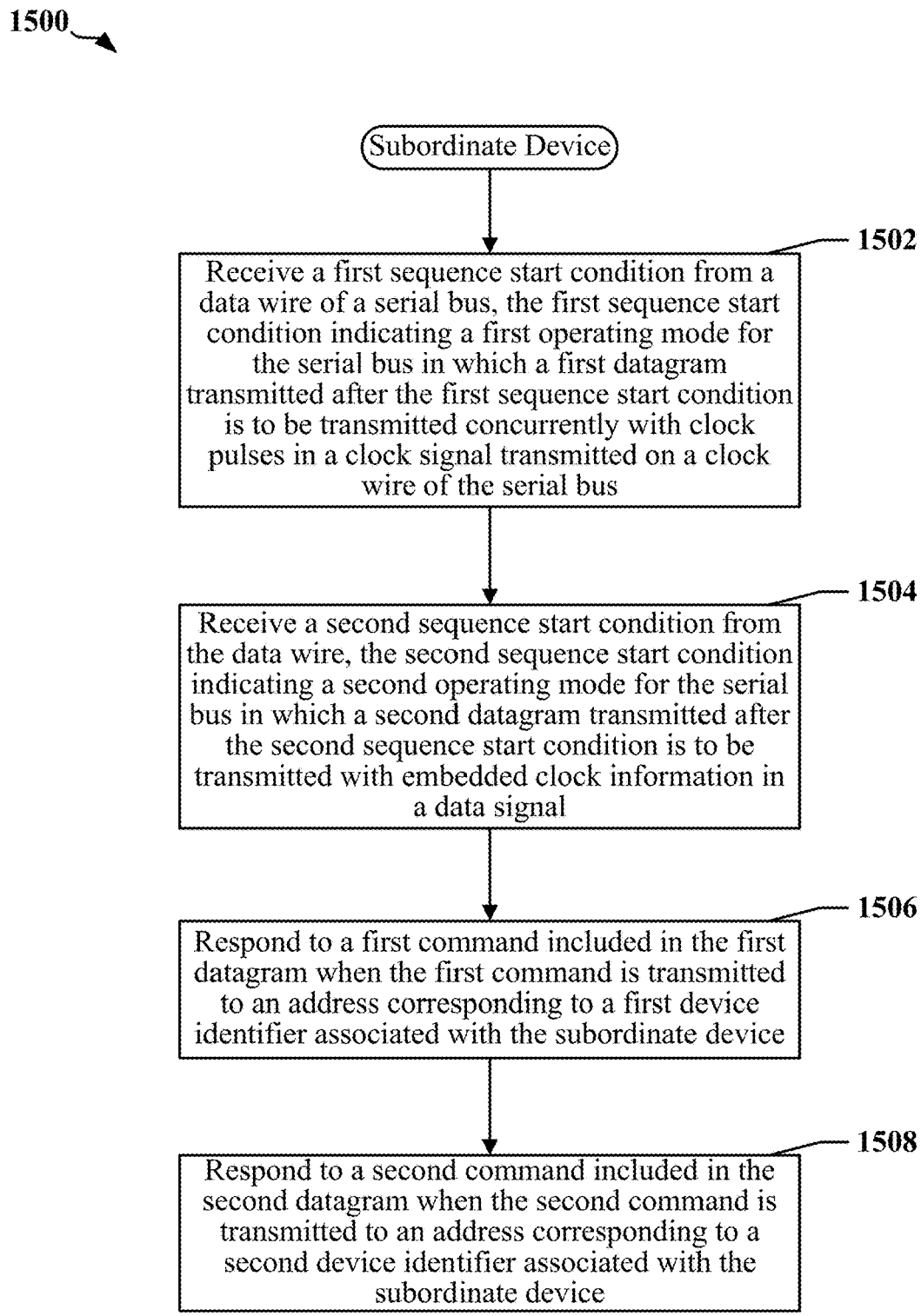
FIG. 15 is a flowchart that illustrates a method for data communication at a one-wire subordinate device in accordance with certain aspects disclosed herein.

FIG. 15 is a flowchart 1500 of a method that may be performed by a dual-mode subordinate device coupled to a serial bus. At least one host device is coupled to the serial bus. One or more one-wire subordinate devices and one or more two-wire subordinate devices may be coupled to the serial bus.

At block 1502, the dual-mode subordinate device may receive a first sequence start condition from a data wire of the serial bus, the first sequence start condition indicating a first operating mode for the serial bus in which a first datagram transmitted after the first sequence start condition is to be transmitted concurrently with clock pulses in a clock signal transmitted on a clock wire of the serial bus. At block 1504, the dual-mode subordinate device may receive a second sequence start condition from the data wire, the second sequence start condition indicating a second operating mode for the serial bus in which a second datagram transmitted after the second sequence start condition is to be transmitted with embedded clock information in a data signal. At block 1506, the dual-mode subordinate device may respond to a first command included in the first datagram when the first command is transmitted to an address corresponding to a first device identifier associated with the subordinate device. At block 1508, the dual-mode subordinate device may respond to a second command included in the second datagram when the second command is transmitted to an address corresponding to a second device identifier associated with the subordinate device. In one example, the first device identifier has the same value as the second device identifier. In another example, the first device identifier and the second device identifier have different values.

In some implementations, the dual-mode subordinate device may ignore a third sequence start condition when the third sequence start condition is preceded by an idle period that has a duration less than transmission time of a data byte transmitted over the serial bus.

In some implementations, the dual-mode subordinate device may receive a lock command restricting the subordinate device to the first operating mode, and may discard a third command included in a third datagram transmitted when the serial bus is operated in the second operating mode.

In some implementations, the dual-mode subordinate device may receive a lock command restricting the subordinate device to the second operating mode, and may discard a fourth command included in a fourth datagram transmitted when the serial bus is operated in the first operating mode.

In some implementations, the sequence start condition has a first duration when indicating that the clock pulses are to be concurrently provided in the clock signal and a second duration longer than the first duration when indicating that no clock pulses are to be concurrently provided in the clock signal.

Figure 16:
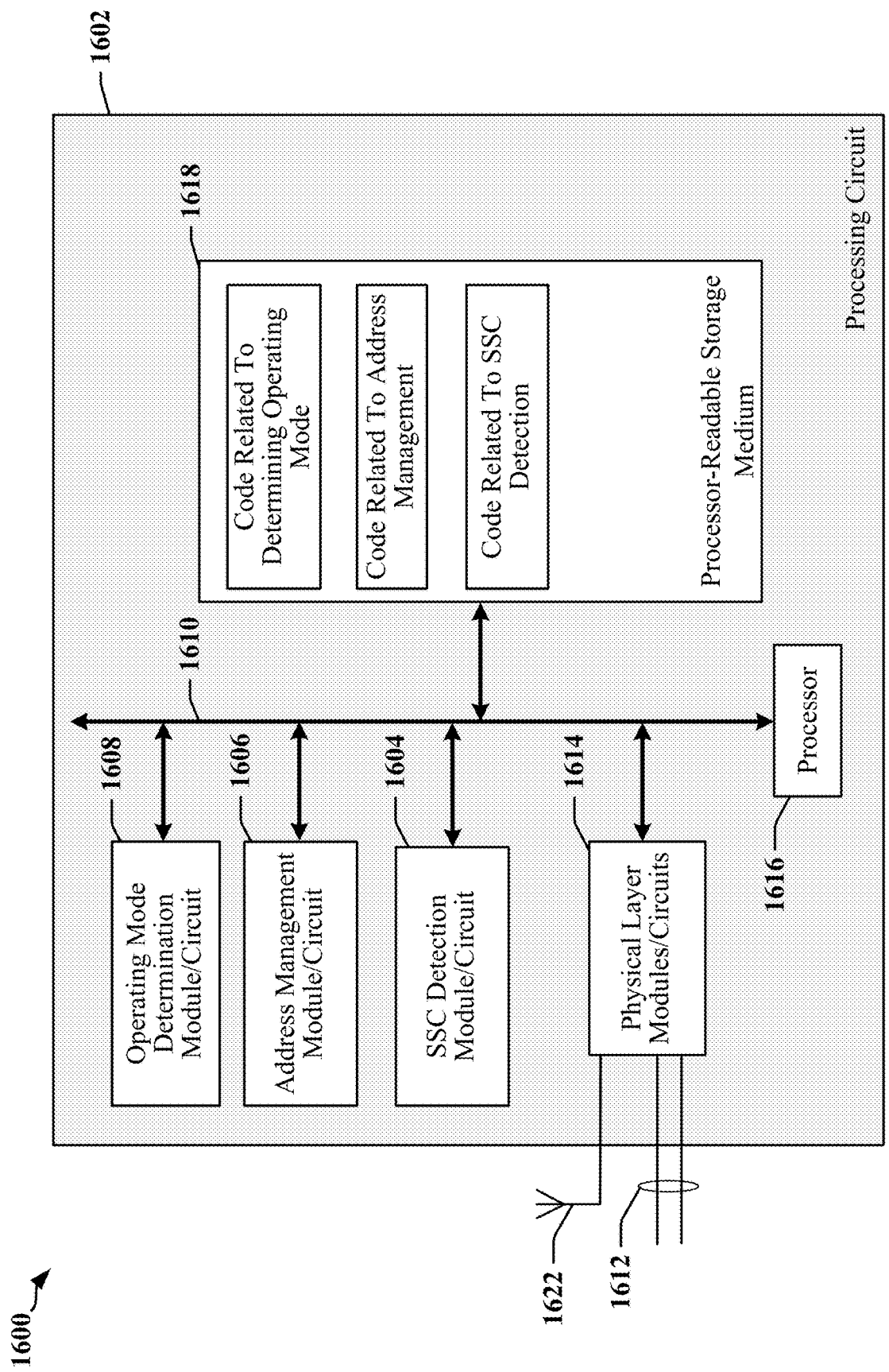
FIG. 16 illustrates an example of a hardware implementation for a one-wire slave apparatus adapted in accordance with certain aspects disclosed herein.

FIG. 16 is a diagram illustrating a simplified example of a hardware implementation for an apparatus 1600 employing a processing circuit 1602. The processing circuit typically has a controller or processor 1616 that may include one or more microprocessors, microcontrollers, digital signal processors, sequencers and/or state machines. The processing circuit 1602 may be implemented with a bus architecture, represented generally by the bus 1610. The bus 1610 may include any number of interconnecting buses and bridges depending on the specific application of the processing circuit 1602 and the overall design constraints. The bus 1610 links together various circuits including one or more processors and/or hardware modules, represented by the controller or processor 1616, the modules or circuits 1604, 1606 and 1608 and the processor-readable storage medium 1618. One or more physical layer circuits and/or modules 1614 may be provided to support communications over a communication link implemented using a multi-wire bus 1612, through an antenna or antenna array 1622 (to a radio access network for example), and so on. The bus 1610 may also link various other circuits such as timing sources, peripherals, voltage regulators, and power management circuits, which are well known in the art, and therefore, will not be described any further.

The processor 1616 is responsible for general processing, including the execution of software, code and/or instructions stored on the processor-readable storage medium 1618. The processor-readable storage medium may include a non-transitory storage medium. The software, when executed by the processor 1616, causes the processing circuit 1602 to perform the various functions described supra for any particular apparatus. The processor-readable storage medium may be used for storing data that is manipulated by the processor 1616 when executing software. The processing circuit 1602 further includes at least one of the modules 1604, 1606 and 1608. The modules 1604, 1606 and 1608 may be software modules running in the processor 1616, resident/stored in the processor-readable storage medium 1618, one or more hardware modules coupled to the processor 1616, or some combination thereof. The modules 1604, 1606 and 1608 may include microcontroller instructions, state machine configuration parameters, or some combination thereof.

In one configuration, the apparatus 1600 includes modules and/or circuits 1604 adapted to detect SSCs that indicate whether a one-wire transaction or a two-wire transaction is to be conducted over the serial bus based on the duration of the SSCs. The apparatus 1600 may include modules and/or circuits 1606 adapted to manage addresses used when engaging in one-wire and two-wire transactions, and modules and/or circuits 1608 adapted to determine operating modes, including one-wire and two-wire operating modes.

In one example, the apparatus 1600 includes physical layer circuits and/or modules 1614 that implement an interface circuit adapted to couple the apparatus 1600 to a serial bus. The apparatus 1600 may have a protocol controller. The processor 1616 may be configured to receive a first sequence start condition from a data wire of the serial bus, the first sequence start condition indicating a first operating mode for the serial bus in which a first datagram transmitted after the first sequence start condition is to be transmitted concurrently with clock pulses in a clock signal transmitted on a clock wire of the serial bus; receive a second sequence start condition from the data wire, the second sequence start condition indicating a second operating mode for the serial bus in which a second datagram transmitted after the second sequence start condition is to be transmitted with embedded clock information in a data signal; respond to a first command included in the first datagram when the first command is transmitted to an address corresponding to a first device identifier associated with the subordinate device; and respond to a second command included in the second datagram when the second command is transmitted to an address corresponding to a second device identifier associated with the subordinate device. The first device identifier may have the same value as the second device identifier or the first device identifier and the second device identifier may have different values.

In some implementations, the processor 1616 is further configured to ignore a third sequence start condition when the third sequence start condition is preceded by an idle period that has a duration less than transmission time of a data byte transmitted over the serial bus.

In some implementations, the processor 1616 is further configured to receive a lock command restricting the subordinate device to the first operating mode; and discard a third command included in a third datagram transmitted when the serial bus is operated in the second operating mode.

In some implementations, the processor 1616 is further configured to receive a lock command restricting the subordinate device to the second operating mode; and discard a fourth command included in a fourth datagram transmitted when the serial bus is operated in the first operating mode.

In some implementations, the sequence start condition has a first duration when indicating that the clock pulses are to be concurrently provided in the clock signal and a second duration longer than the first duration when indicating that no clock pulses are to be concurrently provided in the clock signal.

The processor-readable storage medium 1618 may include transitory or non-transitory storage devices configured to store code, instructions and/or parameters used to implement one or more methods or procedures disclosed herein. The processor-readable storage medium 1618 may include code for receiving a first sequence start condition from a data wire of a serial bus, the first sequence start condition indicating a first operating mode for the serial bus in which a first datagram transmitted after the first sequence start condition is to be transmitted concurrently with clock pulses in a clock signal transmitted on a clock wire of the serial bus; receiving a second sequence start condition from the data wire, the second sequence start condition indicating a second operating mode for the serial bus in which a second datagram transmitted after the second sequence start condition is to be transmitted with embedded clock information in a data signal; responding to a first command included in the first datagram when the first command is transmitted to an address corresponding to a first device identifier associated with the subordinate device; and responding to a second command included in the second datagram when the second command is transmitted to an address corresponding to a second device identifier associated with the subordinate device.

In some implementations, the processor-readable storage medium 1618 includes code for ignoring a third sequence start condition when the third sequence start condition is preceded by an idle period that has a duration less than transmission time of a data byte transmitted over the serial bus.

In some implementations, the processor-readable storage medium 1618 includes code for receiving a lock command restricting the subordinate device to the first operating mode; and discarding a third command included in a third datagram transmitted when the serial bus is operated in the second operating mode.

In some implementations, the processor-readable storage medium 1618 includes code for receiving a lock command restricting the subordinate device to the second operating mode; and discarding a fourth command included in a fourth datagram transmitted when the serial bus is operated in the first operating mode.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Some implementation examples are described in the following numbered clauses:

1. A method of data communication at a host device, comprising: configuring each of a first plurality of subordinate devices with a device identifier that is unique within the first plurality of subordinate devices; configuring each of a second plurality of subordinate devices with a device identifier that is unique within the second plurality of subordinate devices; transmitting a sequence start condition over a data wire of a serial bus, the sequence start condition indicating whether clock pulses are to be provided in a clock signal on a clock wire of the serial bus concurrently with a transaction initiated by the sequence start condition; using a device identifier associated with the first plurality of subordinate devices to transmit a first datagram over the serial bus to one of the first plurality of subordinate devices when the sequence start condition indicates that the clock pulses are to be concurrently provided in the clock signal; and using a device identifier associated with the second plurality of subordinate devices to transmit a second datagram over the serial bus to one of the second plurality of subordinate devices when the sequence start condition indicates that no clock pulses are to be concurrently provided in the clock signal.

2. The method as described in clause 1, wherein one of the first plurality of subordinate devices and one of the second plurality of subordinate devices have a same device identifier.

3. The method as described in clause 1 or clause 2, wherein a dual-mode subordinate device is included in the first plurality of subordinate devices and in the second plurality of subordinate devices.

4. The method as described in clause 3, further comprising: configuring the dual-mode subordinate device with a first device identifier that is associated with the first plurality of subordinate devices and used by the dual-mode subordinate device for communicating over the serial bus when the sequence start condition indicates that the clock pulses are to be concurrently provided in the clock signal; and configuring the dual-mode subordinate device with a second device identifier that is associated with the second plurality of subordinate devices and used by the dual-mode subordinate device for communicating over the serial bus when the sequence start condition indicates that no clock pulses are to be concurrently provided in the clock signal.

5. The method as described in clause 4, wherein the first device identifier has a same value as the second device identifier.

6. The method as described in clause 4, wherein the first device identifier and the second device identifier have different values.

7. The method as described in any of clauses 1-6, wherein the sequence start condition has a first duration when indicating that the clock pulses are to be concurrently provided in the clock signal and a second duration longer than the first duration when indicating that no clock pulses are to be concurrently provided in the clock signal.

8. The method as described in any of clauses 1-7, further comprising: configuring each of the second plurality of subordinate devices to ignore the sequence start condition unless the sequence start condition is preceded by an idle period that has a minimum duration calculated based on transmission time of a data byte transmitted over the serial bus.

9. A data communication apparatus, comprising: an interface circuit adapted to couple the data communication apparatus to two wires of a serial bus; and a protocol controller configured to: configure each of a first plurality of subordinate devices with a device identifier that is unique within the first plurality of subordinate devices; configure each of a second plurality of subordinate devices with a device identifier that is unique within the second plurality of subordinate devices; transmit a sequence start condition over a data wire of the serial bus, the sequence start condition indicating whether clock pulses are to be provided in a clock signal on a clock wire of the serial bus concurrently with a transaction initiated by the sequence start condition; use a device identifier associated with the first plurality of subordinate devices to transmit a first datagram over the serial bus to one of the first plurality of subordinate devices when the sequence start condition indicates that the clock pulses are to be concurrently provided in the clock signal; and use a device identifier associated with the second plurality of subordinate devices to transmit a second datagram over the serial bus to one of the second plurality of subordinate devices when the sequence start condition indicates that no clock pulses are to be concurrently provided in the clock signal.

10. The data communication apparatus as described in clause 9, wherein one of the first plurality of subordinate devices and one of the second plurality of subordinate devices have a same device identifier.

11. The data communication apparatus as described in clause 9 or clause 10, wherein a dual-mode subordinate device is included in the first plurality of subordinate devices and in the second plurality of subordinate devices.

12. The data communication apparatus as described in clause 11, wherein the protocol controller is further configured to: configure the dual-mode subordinate device with a first device identifier that is associated with the first plurality of subordinate devices and used by the dual-mode subordinate device for communicating over the serial bus when the sequence start condition indicates that the clock pulses are to be concurrently provided in the clock signal; and configure the dual-mode subordinate device with a second device identifier that is associated with the second plurality of subordinate devices and used by the dual-mode subordinate device for communicating over the serial bus when the sequence start condition indicates that no clock pulses are to be concurrently provided in the clock signal.

13. The data communication apparatus as described in clause 12, wherein the first device identifier has a same value as the second device identifier.

14. The data communication apparatus as described in clause 12, wherein the first device identifier and the second device identifier have different values.

15. The data communication apparatus as described in any of clauses 9-14, wherein the sequence start condition has a first duration when indicating that the clock pulses are to be concurrently provided in the clock signal and a second duration longer than the first duration when indicating that no clock pulses are to be concurrently provided in the clock signal.

16. The data communication apparatus as described in any of clauses 9-15, wherein the protocol controller is further configured to: configure each of the second plurality of subordinate devices to ignore the sequence start condition unless the sequence start condition is preceded by an idle period that has a minimum duration calculated based on transmission time of a data byte transmitted over the serial bus.

17. A method of data communication at a subordinate device, comprising: receiving a first sequence start condition from a data wire of a serial bus, the first sequence start condition indicating a first operating mode for the serial bus in which a first datagram transmitted after the first sequence start condition is to be transmitted concurrently with clock pulses in a clock signal transmitted on a clock wire of the serial bus; receiving a second sequence start condition from the data wire, the second sequence start condition indicating a second operating mode for the serial bus in which a second datagram transmitted after the second sequence start condition is to be transmitted with embedded clock information in a data signal; responding to a first command included in the first datagram when the first command is transmitted to an address corresponding to a first device identifier associated with the subordinate device; and responding to a second command included in the second datagram when the second command is transmitted to an address corresponding to a second device identifier associated with the subordinate device.

18. The method as described in clause 17, wherein the first device identifier has a same value as the second device identifier.

19. The method as described in clause 17, wherein the first device identifier and the second device identifier have different values.

20. The method as described in any of clauses 17-19, further comprising: ignoring a third sequence start condition when the third sequence start condition is preceded by an idle period that has a duration less than transmission time of a data byte transmitted over the serial bus.

21. The method as described in any of clauses 17-20, further comprising: receiving a lock command restricting the subordinate device to the first operating mode; and discarding a third command included in a third datagram transmitted when the serial bus is operated in the second operating mode.

22. The method as described in any of clauses 17-20, further comprising: receiving a lock command restricting the subordinate device to the second operating mode; and discarding a fourth command included in a fourth datagram transmitted when the serial bus is operated in the first operating mode.

23. The method as described in any of clauses 17-22, wherein the first sequence start condition has a first duration and the second sequence start condition has a second duration longer than the first duration.

24. An apparatus comprising: an interface circuit adapted to couple the apparatus to a serial bus; and a processor configured to: receive a first sequence start condition from a data wire of the serial bus, the first sequence start condition indicating a first operating mode for the serial bus in which a first datagram transmitted after the first sequence start condition is to be transmitted concurrently with clock pulses in a clock signal transmitted on a clock wire of the serial bus; receive a second sequence start condition from the data wire, the second sequence start condition indicating a second operating mode for the serial bus in which a second datagram transmitted after the second sequence start condition is to be transmitted with embedded clock information in a data signal; respond to a first command included in the first datagram when the first command is transmitted to an address corresponding to a first device identifier associated with the apparatus; and respond to a second command included in the second datagram when the second command is transmitted to an address corresponding to a second device identifier associated with the apparatus.

25. The apparatus as described in clause 24, wherein the first device identifier has a same value as the second device identifier.

26. The apparatus as described in clause 24, wherein the first device identifier and the second device identifier have different values.

27. The apparatus as described in any of clauses 24-26, wherein the processor is further configured to: ignore a third sequence start condition when the third sequence start condition is preceded by an idle period that has a duration less than transmission time of a data byte transmitted over the serial bus.

28. The apparatus as described in any of clauses 24-27, wherein the processor is further configured to: receive a lock command restricting the apparatus to the first operating mode; and discard a third command included in a third datagram transmitted when the serial bus is operated in the second operating mode.

29. The apparatus as described in any of clauses 24-27, wherein the processor is further configured to: receive a lock command restricting the apparatus to the second operating mode; and discard a fourth command included in a fourth datagram transmitted when the serial bus is operated in the first operating mode.

30. The apparatus as described in any of clauses 24-29, wherein the first sequence start condition has a first duration and the second sequence start condition has a second duration longer than the first duration.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communication at a host device, comprising:
    causing a protocol controller in the host device coupled to a serial bus to configure each of a first plurality of subordinate devices with a device identifier that is unique within the first plurality of subordinate devices;
    causing the protocol controller to configure each of a second plurality of subordinate devices with a device identifier that is unique within the second plurality of subordinate devices;
    setting an operating mode for the host device based on capabilities of another device that is selected to participate in one or more transactions, wherein each of the first plurality of subordinate devices is capable of operation when clock pulses are provided on a clock wire of the serial bus, and wherein each of the second plurality of subordinate devices is capable of operation when clock pulses are not provided on the clock wire of the serial bus;
    transmitting sequence start conditions over the serial bus, each of the sequence start conditions being configured to initiate a corresponding transaction and to indicate whether clock pulses are to be transmitted in a clock signal over the clock wire of the serial bus during the corresponding transaction;
    using a device identifier associated with the first plurality of subordinate devices to transmit a first datagram over the serial bus to one of the first plurality of subordinate devices when the sequence start condition indicates that the clock pulses are to be concurrently provided in the clock signal; and
    using a device identifier associated with the second plurality of subordinate devices to transmit a second datagram over the serial bus to one of the second plurality of subordinate devices when the sequence start condition indicates that no clock pulses are to be concurrently provided in the clock signal.

2. The method of claim 1, wherein one of the first plurality of subordinate devices and one of the second plurality of subordinate devices have a same device identifier.

3. The method of claim 1, wherein a dual-mode subordinate device is included in the first plurality of subordinate devices and in the second plurality of subordinate devices.

4. The method of claim 3, further comprising:
    configuring the dual-mode subordinate device with a first device identifier that is associated with the first plurality of subordinate devices and used by the dual-mode subordinate device for communicating over the serial bus when the sequence start condition indicates that the clock pulses are to be concurrently provided in the clock signal; and
    configuring the dual-mode subordinate device with a second device identifier that is associated with the second plurality of subordinate devices and used by the dual-mode subordinate device for communicating over the serial bus when the sequence start condition indicates that no clock pulses are to be concurrently provided in the clock signal.

5. The method of claim 4, wherein the first device identifier has a same value as the second device identifier.

6. The method of claim 4, wherein the first device identifier and the second device identifier have different values.

7. The method of claim 1, wherein the sequence start condition has a first duration when indicating that the clock pulses are to be concurrently provided in the clock signal and a second duration longer than the first duration when indicating that no clock pulses are to be concurrently provided in the clock signal.

8. The method of claim 1, further comprising:
    causing the protocol controller to configure each of the second plurality of subordinate devices to ignore the sequence start condition unless the sequence start condition is preceded by an idle period that has a minimum duration calculated based on transmission time of a data byte transmitted over the serial bus.

9. A data communication apparatus, comprising:
    an interface circuit adapted to couple the data communication apparatus to two wires of a serial bus; and
    a protocol controller configured to:
        configure each of a first plurality of subordinate devices with a device identifier that is unique within the first plurality of subordinate devices;
        configure each of a second plurality of subordinate devices with a device identifier that is unique within the second plurality of subordinate devices;
        set an operating mode for the interface circuit based on capabilities of another device that is selected to participate in one or more transactions, wherein each of the first plurality of subordinate devices is capable of operation when clock pulses are provided on a clock wire of the serial bus, and wherein each of the second plurality of subordinate devices is capable of operation when clock pulses are not provided on the clock wire of the serial bus;

transmit sequence start conditions over the serial bus, each of the sequence start conditions being configured to initiate a corresponding transaction and to indicate whether clock pulses are to be transmitted in a clock signal over the clock wire of the serial bus during the corresponding transaction;

use a device identifier associated with the first plurality of subordinate devices to transmit a first datagram over the serial bus to one of the first plurality of subordinate devices when the sequence start condition indicates that the clock pulses are to be concurrently provided in the clock signal; and use a device identifier associated with the second plurality of subordinate devices to transmit a second datagram over the serial bus to one of the second plurality of subordinate devices when the sequence start condition indicates that no clock pulses are to be concurrently provided in the clock signal.

10. The data communication apparatus of claim 9, wherein one of the first plurality of subordinate devices and one of the second plurality of subordinate devices have a same device identifier.

11. The data communication apparatus of claim 9, wherein a dual-mode subordinate device is included in the first plurality of subordinate devices and in the second plurality of subordinate devices.

12. The data communication apparatus of claim 11, wherein the protocol controller is further configured to:

configure the dual-mode subordinate device with a first device identifier that is associated with the first plurality of subordinate devices and used by the dual-mode subordinate device for communicating over the serial bus when the sequence start condition indicates that the clock pulses are to be concurrently provided in the clock signal; and configure the dual-mode subordinate device with a second device identifier that is associated with the second plurality of subordinate devices and used by the dual-mode subordinate device for communicating over the serial bus when the sequence start condition indicates that no clock pulses are to be concurrently provided in the clock signal.

13. The data communication apparatus of claim 12, wherein the first device identifier has a same value as the second device identifier.

14. The data communication apparatus of claim 12, wherein the first device identifier and the second device identifier have different values.

15. The data communication apparatus of claim 9, wherein the sequence start condition has a first duration when indicating that the clock pulses are to be concurrently provided in the clock signal and a second duration longer than the first duration when indicating that no clock pulses are to be concurrently provided in the clock signal.

16. The data communication apparatus of claim 9, wherein the protocol controller is further configured to:

configure each of the second plurality of subordinate devices to ignore the sequence start condition unless the sequence start condition is preceded by an idle period that has a minimum duration calculated based on transmission time of a data byte transmitted over the serial bus.

17. A method of data communication at a subordinate device, comprising:

receiving a first sequence start condition from a data wire of a serial bus, the first sequence start condition indicating a first operating mode for the serial bus in which a first datagram transmitted after the first sequence start condition is to be transmitted concurrently with clock pulses in a clock signal transmitted on a clock wire of the serial bus;

setting a first operating mode for the subordinate device based on duration of the first sequence start condition, wherein clock pulses are provided on a clock wire of the serial bus when the first operating mode is set;

responding to a first command included in the first datagram when the first command is transmitted to an address corresponding to a first device identifier associated with the subordinate device; and setting a second operating mode for the subordinate device based on duration of the first sequence start condition, wherein clock pulses are not provided on the clock wire of the serial bus when the second operating mode is set;

receiving a second sequence start condition from the data wire, the second sequence start condition indicating a second operating mode for the serial bus in which a second datagram is transmitted after the second sequence start condition using clock information provided by an internal clock signal; and responding to a second command included in the second datagram when the second command is transmitted to an address corresponding to a second device identifier associated with the subordinate device.

18. The method of claim 17, wherein the first device identifier has a same value as the second device identifier.

19. The method of claim 17, wherein the first device identifier and the second device identifier have different values.

20. The method of claim 17, further comprising:

ignoring a third sequence start condition when the third sequence start condition is preceded by an idle period that has a duration less than transmission time of a data byte transmitted over the serial bus.

21. The method of claim 17, further comprising:

receiving a lock command restricting the subordinate device to the first operating mode; and discarding a third command included in a third datagram transmitted when the serial bus is operated in the second operating mode.

22. The method of claim 17, further comprising:

receiving a lock command restricting the subordinate device to the second operating mode; and discarding a fourth command included in a fourth datagram transmitted when the serial bus is operated in the first operating mode.

23. The method of claim 17, wherein the first sequence start condition has a first duration and the second sequence start condition has a second duration longer than the first duration.

24. An apparatus comprising:

an interface circuit adapted to couple the apparatus to a serial bus; and a processor configured to:

receive a first sequence start condition from a data wire of the serial bus, the first sequence start condition indicating a first operating mode for the serial bus in which a first datagram transmitted after the first sequence start condition is to be transmitted concurrently with clock pulses in a clock signal transmitted on a clock wire of the serial bus;

set a first operating mode for the interface circuit based on duration of the first sequence start condition, wherein clock pulses are provided on a clock wire of the serial bus when the first operating mode is set;

respond to a first command included in the first datagram when the first command is transmitted to an address corresponding to a first device identifier associated with the apparatus; and set a second operating mode for the interface circuit based on duration of the first sequence start condition, wherein clock pulses are not provided on the clock wire of the serial bus when the second operating mode is set;

receive a second sequence start condition from the data wire, the second sequence start condition indicating a second operating mode for the serial bus in which a second datagram is transmitted after the second sequence start condition using clock information provided by an internal clock signal; and respond to a second command included in the second datagram when the second command is transmitted to an address corresponding to a second device identifier associated with the apparatus.

25. The apparatus of claim 24, wherein the first device identifier has a same value as the second device identifier.

26. The apparatus of claim 24, wherein the first device identifier and the second device identifier have different values.

27. The apparatus of claim 24, wherein the processor is further configured to:

ignore a third sequence start condition when the third sequence start condition is preceded by an idle period that has a duration less than transmission time of a data byte transmitted over the serial bus.

28. The apparatus of claim 24, wherein the processor is further configured to:

receive a lock command restricting the apparatus to the first operating mode; and discard a third command included in a third datagram transmitted when the serial bus is operated in the second operating mode.

29. The apparatus of claim 24, wherein the processor is further configured to:

receive a lock command restricting the apparatus to the second operating mode; and discard a fourth command included in a fourth datagram transmitted when the serial bus is operated in the first operating mode.

30. The apparatus of claim 24, wherein the first sequence start condition has a first duration and the second sequence start condition has a second duration longer than the first duration.

* * * * *